US007130448B2

(12) United States Patent
Nagaoka et al.

(10) Patent No.: US 7,130,448 B2
(45) Date of Patent: Oct. 31, 2006

(54) DEVICE FOR MONITORING AROUND A VEHICLE

(75) Inventors: Nobuharu Nagaoka, Nasu-gun (JP); Takayuki Tsuji, Utsunomiya (JP); Masahito Watanabe, Utsunomiya (JP); Hiroshi Hattori, Utsunomiya (JP); Izumi Takatsudo, Utsunomiya (JP); Masakazu Saka, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 652 days.

(21) Appl. No.: 10/346,517

(22) Filed: Jan. 17, 2003

(65) Prior Publication Data

US 2003/0138133 A1 Jul. 24, 2003

(30) Foreign Application Priority Data

| Jan. 18, 2002 | (JP) | ............................. 2002-010576 |
| Oct. 10, 2002 | (JP) | ............................. 2002-297219 |
| Oct. 10, 2002 | (JP) | ............................. 2002-297220 |

(51) Int. Cl.
*G06K 9/00* (2006.01)

(52) U.S. Cl. ...................... 382/104; 382/103; 382/203; 382/274; 340/925; 340/907; 340/435; 348/164; 348/148

(58) Field of Classification Search ............... 382/103, 382/104, 203, 274; 340/907, 925, 435; 348/164, 348/148

See application file for complete search history.

(56) References Cited

U.S. PATENT DOCUMENTS

| 4,954,962 | A | * | 9/1990 | Evans et al. ................... 701/28 |
| 5,059,796 | A | * | 10/1991 | Nakamura ................... 250/330 |
| 5,475,494 | A | * | 12/1995 | Nishida et al. ............. 356/4.01 |
| 5,963,148 | A | * | 10/1999 | Sekine et al. ................ 340/905 |
| 6,141,433 | A | * | 10/2000 | Moed et al. ................. 382/103 |
| 6,327,536 | B1 | * | 12/2001 | Tsuji et al. ................. 701/301 |
| 6,493,620 | B1 | | 12/2002 | Zhang |
| 6,690,011 | B1 | | 2/2004 | Watanabe et al. |
| 6,759,949 | B1 | | 7/2004 | Miyahara |
| 6,789,015 | B1 | | 9/2004 | Tsuji et al. |

FOREIGN PATENT DOCUMENTS

| JP | 2000-019259 | 6/1998 |
| JP | 11-328364 | 11/1999 |
| JP | 2001-006096 | 1/2001 |
| JP | 2001-108758 | * 4/2001 |

* cited by examiner

Primary Examiner—Jingge Wu
Assistant Examiner—Shefali Patel
(74) Attorney, Agent, or Firm—Carrier, Blackman & Associates, P.C.; Joseph P. Carrier; William D. Blackman

(57) ABSTRACT

A device for monitoring around a vehicle capable of detecting objects present around the vehicle based on an image captured by at least one infrared camera member provided with the vehicle. The device includes a binary object extraction unit which subjects a gray scale image of the image captured by the infrared camera member to a binary thresholding method, and extracts a binary object from the gray scale image; a gray scale object extraction unit which extracts a gray scale object, a range of the gray scale object including the binary object, from the gray scale image based on change in luminance of the gray scale image, and a pedestrian determination unit which sets a search area in an area including the gray scale object, and recognizes a pedestrian in the gray scale image based on a luminance variance in the search area.

11 Claims, 17 Drawing Sheets

ARTICLES IN FRAMES P1 TO P4 ARE OBJECTS TO BE ANALYZED

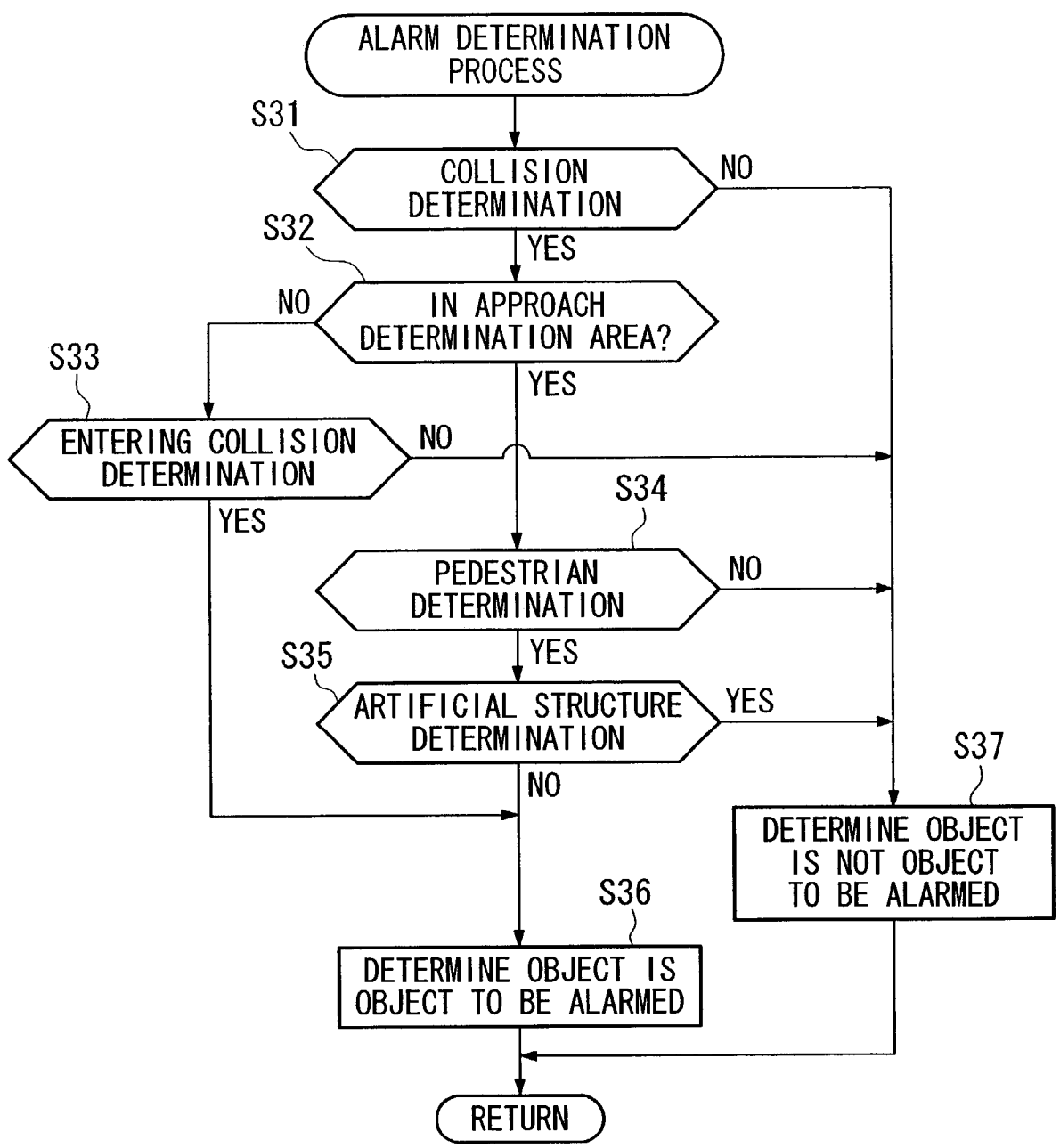

P1: COORDINATES OF UPPER END POSITION OF OBJECT
HEIGHT OF OBJECT $\Delta Hg$ [m]
MEAN LUMINANCE OF AREA1 Ave_A1
LUMINANCE DISPERSION OF AREA2 Var_A2
LUMINANCE DISPERSION OF AREA3 Var_A3

DEVICE FOR MONITORING AROUND A VEHICLE

BACKGROUND OF THE INVENTION

1. Field of the Invention

The present invention relates to devices for monitoring around a vehicle. More specifically, the present invention relates to a device for monitoring around a vehicle in which target extraction is carried out by subjecting an image captured by an infrared camera device to a binary thresholding method.

2. Description of Related Art

Devices for monitoring around a vehicle have been proposed in which objects that may collide with the vehicle, such as pedestrians, are extracted from a picture around the vehicle captured by an infrared camera, and such information is supplied to a driver of the vehicle. In these devices, the probability that the vehicle will hit an object, such as a pedestrian, is calculated based on the relative distance between the vehicle and the object, and the relative speed of the vehicle.

An example of such devices for monitoring around a vehicle which extracts an object, which may collide with the vehicle, from an image around the vehicle captured by an infrared camera is as follows. That is, in the device, the captured infrared image is subjected to a binary (2-level) thresholding process, and an area to which bright (white) portions are concentrated is searched for. Then, it is determined whether the area is a head portion of a pedestrian by using the aspect ratio (ratio of length to width) and the sufficiency rate of the area, and further calculating the distance between the vehicle and the area using the actual surface area and the position of the center of gravity in the image. If the area of the head portion of a pedestrian is determined, an area which forms the body of the pedestrian is determined by calculating the height of the pedestrian in the image based on the distance between the area determined to be the head portion and the camera, and an average height of an adult. These areas are displayed to be distinguished from the other regions of the image. In this manner, the position of the entire body of the pedestrian in the infrared image is determined, and this information is displayed for the driver so as to effectively assist the vision of the driver (refer to Japanese Unexamined Patent Application, First Publication No. Hei 11-328364, for example).

However, using the thresholding method, only the head portion, a part of the head portion, or the entire or only an upper half or a lower half of the body, of a pedestrian may be extracted from an infrared image, depending on the effects of a hat or clothing the pedestrian is wearing, or of the environment surrounding the pedestrian, and thus the shape of the pedestrian obtained by the binary thresholding method becomes ambiguous. Also, when a vehicle is running, due to the influence in change in the shape of a road ahead, or the pitting of the vehicle, the height of a pedestrian, from a child to an adult, is generally detected to be different from his/her real height.

Accordingly, since the barycentric coordinates of targeted objects, such as pedestrians, in the picture cannot be fixed with respect to the distance, there is a possibility that the pedestrians cannot be stably extracted if the extraction is carried out based only on the shape of the pedestrians as in the above-mentioned conventional device.

Also, there are other types of conventional devices in which portions of high temperature in a picture around the vehicle captured by a pair of right and left stereo-cameras are recognized as objects, and the distance between the vehicle and the objects is calculated by obtaining the parallax of the objects so that targeting objects which may interfere with the running course of the vehicle can be detected based on a moving direction and a position of the objects, and an alarm can be output (refer to Japanese Unexamined Patent Application, First Publication No. 2001-6096, for example).

As mentioned above, if the extraction is carried out based only on the shape of the object as in the above-mentioned conventional device using the thresholding method, the shape of the targeting object becomes ambiguous due to the influence of a hat or clothing the targeting object (i.e., pedestrians, etc.) is wearing, and the environment surrounding the pedestrian. Also, when a vehicle is running, the height of a pedestrian is generally detected to be different from his/her real height due to the influence of change in the shape of a road ahead, or the pitting of the vehicle, and the barycentric coordinates of the target in the picture cannot be fixed with respect to the distance. Accordingly, it is difficult to stably carry out the extraction of only pedestrians.

For the reasons explained above, methods have been proposed in which only objects that are likely to be pedestrians are extracted by calculating the size of the objects in real space based on a gray scale image, and determining the positional relationship of the objects, images of which have been subjected to the thresholding method, or in which structures on the road and vehicles are extracted from objects subjected to the thresholding method, and they are recognized as objects other than pedestrians so as to be removed from the objects for which an alarm is necessary. However, using the above methods, when a vehicle is running in the rain, for instance, since objects are affected by the rain and the amount of infrared rays is changed, there is a problem that extraction of pedestrians cannot be stably carried out.

That is, in a typical environment, since the temperature of heat-retaining objects, which do not generate heat by themselves but retain heat which was externally applied, such as signboards, walls, and telegraph poles, decreases due to rain, it becomes difficult to detect them using an infrared camera (i.e., they tend not to appear in an infrared picture). Also, although heat generating objects which generate heat by themselves, such as vending machines, can be detected using an infrared camera, portions that emit infrared rays and can be detected are significantly decreased in the rain, and there is a tendency for an accurate determination of the shape thereof to become difficult.

Also, as for a pedestrian, although portions that are exposed to the outside (e.g., head) may be detected, portions of the pedestrian that are covered by the clothing may not be detected using an infrared camera depending on the degree to which the clothing is wet. That is, the situation around a vehicle differs even at the same point of a place depending on the weather, and the shape of all objects in a gray scale image detected by an infrared camera varies. Accordingly, there is a danger in the conventional methods that the extraction of only pedestrians from the image cannot be stably performed.

Moreover, when it is raining, the shape of objects in the image tends to become ambiguous since rain drops attach to the surface of the lens of a camera, and this makes the determination of the shape of the objects even more difficult.

SUMMARY OF THE INVENTION

The present invention takes into consideration the above-mentioned circumstances, and has as an object to provide a device for monitoring around a vehicle in which unclear images of objects obtained by subjecting to a binary thresholding method, which are extracted from a picture taken by a camera, are accurately determined to carry out a stable extraction of targeted objects, such as pedestrians. Other objects and features of the invention will be understood from the following description with reference to the accompanying drawings.

In order to achieve the above objects, the present invention provides a device for monitoring around a vehicle capable of detecting objects present around the vehicle based on an image captured by at least one infrared camera member provided with the vehicle, the device including a binary object extraction unit (for instance, stops S1–S13 explained in embodiments of the present invention described below) which subjects a gray scale image of the image captured by the infrared camera member to a binary thresholding method, and extracts a binary object from the gray scale image; a gray scale object extraction unit (for instance, steps S41–S42 explained in the embodiments of the invention described below) which extracts a gray scale object, a range of the gray scale object including the binary object, from the gray scale image based on change in luminance of the gray scale image, and a pedestrian determination unit (for instance, steps S43–S80 explained in the embodiments of the invention described below) which sets a search area (for instance, mask areas AREA1, AREA2, and AREA3 explained in the embodiments of the invention described below) in an area including the gray scale object (for instance, an AREA0 explained in the embodiments of the invention described below), and recognizes a pedestrian in the gray scale image based on a luminance variance in the search area.

According to the device for monitoring around a vehicle described above, the position of the binary object is recognized in the gray scale image by the binary object extraction unit. It becomes possible to determine whether or not the binary object is a pedestrian based on the characteristics in luminance variance in the search area by setting a gray scale object, the range of which includes the binary object, by the gray scale object extraction unit, and calculating the luminance variance in each search area set on the gray scale object by the pedestrian determination unit. Accordingly, accuracy in detecting a pedestrian may be improved by removing images of objects whose luminance variance is different from that of an image of a pedestrian from the captured image.

In accordance with another aspect of the invention, in the above device for monitoring around a vehicle, the pedestrian determination unit sets the search area so that a size in a transverse direction of the search area matches a width of the binary object and that a size in a longitudinal direction of the search area matches a height of the binary object.

According to the device for monitoring around a vehicle described above, it becomes possible to determine whether or not the binary object is a pedestrian by adjusting the width of the search area in the gray scale image from which the luminance variance is obtained, to the width of the binary object so that the width of the search area becomes a size appropriate for recognizing a pedestrian. Accordingly, accuracy in detecting a pedestrian may be improved by removing objects having characteristics of luminance variance similar to those of pedestrians in the image, such as a wall, from the image including the objects.

In accordance with yet another aspect of the invention, in the above device for monitoring around a vehicle, the pedestrian determination unit sets, as the search area, a head portion area whose size corresponds to a size of a head portion of a pedestrian, based on an upper end of the gray scale object.

According to the device for monitoring around a vehicle described above, it becomes possible to determine whether or not the binary object is a pedestrian by adjusting the size of the search area in the gray scale image from which the luminance variance is obtained, to a size appropriate for recognizing a head portion of a pedestrian. Accordingly, accuracy in detecting a pedestrian may be improved by removing objects from the image, which have a size different from the size of a head portion of a human being which is characteristic to the luminance variance in the image of a pedestrian In accordance with yet another aspect of the invention, in the above device for monitoring around a vehicle, the pedestrian determination unit sets, as the search area, a head portion area whose size corresponds to a size of a head portion of a pedestrian, based on an upper end of the gray scale object, and a body portion area whose size corresponds to a body portion of a pedestrian and is larger than the head portion area, below the head portion area.

According to the device for monitoring around a vehicle described above, it becomes possible to determine whether or not the binary object is a pedestrian by setting the search areas in the gray scale image from which the luminance variance is obtained, i.e., the search area the size of which is appropriate for recognizing a head portion of a pedestrian, and the search area the size of which is appropriate for recognizing a body portion of a pedestrian. Accordingly, accuracy in detecting a pedestrian may be improved by removing objects having characteristics of luminance variance similar to those of pedestrians in the image, such as a curve mirror, from the image including the objects.

In accordance with yet another aspect of the invention, the device for monitoring around a vehicle is a device used as a night vision device.

The present invention also provides a device for monitoring around a vehicle capable of detecting objects present around the vehicle based on an infrared image captured by at least one infrared camera member provided with the vehicle, the device including: an object extraction unit (for instance, steps S1–S13 explained in embodiments of the present invention described below) which extracts objects which emit infrared rays from the infrared image; a heat-retaining object extraction unit (for instance, steps S45, S46, S47, S52, S53, S53-1, S60, S61, and S62 explained in embodiments of the present invention described below) which extracts heat-retaining objects that do not generate heat by themselves but retain heat which was externally applied, from the objects extracted by the object extraction unit, and a pedestrian recognition unit (for instance, steps S48–S50, S54–S59, and S63–S80 explained in embodiments of the present invention described below) which recognizes a pedestrian from the objects extracted by the object extraction unit excluding the heat-retaining objects extracted by the heat-retaining object extraction unit.

According to the device for monitoring around a vehicle described above, it becomes possible to determine whether or not an object is a pedestrian only from detected objects having similar characteristics as a pedestrian from which heat-retaining objects that possess characteristics different from a pedestrian yet may be recognized as a pedestrian due to the influence of the external environment, etc., are excluded using the heat-retaining object extraction unit. Accordingly, accuracy in detecting a pedestrian may be improved by removing objects which emit heat (infrared rays) similar to that from a pedestrian, such as a wall receiving sunlight from the sun, based on the characteristics in the luminance variance.

The present invention also provides a device for monitoring around a vehicle capable of detecting objects present around the vehicle based on an infrared image captured by at least one infrared camera member provided with the vehicle, the device including a weather detection unit (for instance, step S41-1 explained in embodiments of the present invention described below) which detects weather around the vehicle; an object extraction unit (for instance, steps S1–S13 explained in embodiments of the present invention described below) which extracts objects which emit infrared rays from the infrared image; a heat-retaining object extraction unit (for instance, steps S45, S46, S47, S52, S53, S53-1, S60, S61, and S62 explained in embodiments of the present invention described below) which extracts heat-retaining objects that do not generate heat by themselves but retain heat which was externally applied, from the objects extracted by the object extraction unit, and a pedestrian recognition unit (for instance, steps S48–S50, S54–S59, and S63–S80 explained in embodiments of the present invention described below) which recognizes a pedestrian from the objects extracted by the object extraction unit when it is determined that it is raining (the term rain may also include weather having the same effect as rain within the scope of the present invention) around the vehicle by the weather detection unit, the pedestrian recognition unit, when it is determined that it is not raining around the vehicle by the weather detection unit, recognizing a pedestrian among the objects extracted by the object extraction unit excluding the heat-retaining objects extracted by the heat-retaining object extraction unit.

According to the device for monitoring around a vehicle described above, when it is determined that it is raining around die vehicle by the weather detection unit, the pedestrian recognition unit recognizes pedestrians directly from the extracted objects since the amount of infrared rays emitted from the objects which were extracted by the object extraction unit decreases. On the other hand, if it is determined that it is not raining around the vehicle by the weather detection unit, since the difference between the heat-retaining objects which do not generate heat by themselves and retain only heat which was externally applied, and pedestrians that generates heat by themselves appear on the luminance variance in the image of objects due to the infrared rays emitted from the objects extracted by the object extraction unit, it becomes possible to carry out an appropriate pedestrian recognition process in accordance with the circumstances around the vehicle by extracting the heat-retaining objects using the heat-retaining object extraction unit so that the pedestrian recognition unit can recognize a pedestrian among objects excluding the heat-retaining objects.

Accordingly, when it is determined that the weather around the vehicle is not rain, accuracy in detecting a pedestrian may be improved by removing objects which emit heat (infrared rays) similar to that from a pedestrian, such as a wall receiving sunlight from the sun, based on the characteristics of the luminance variance. Also, when it is determined that it is gaining around the vehicle, the determination based on the luminance variance is not carried out so that errors in detecting a pedestrian based on the determination using the luminance variance may be prevented, and accuracy in detecting a pedestrian may be maintained.

In accordance with yet another aspect of the invention, the device for monitoring around a vehicle described above further includes a shape determination unit (for instance, steps S59 and S73, explained in embodiments of the present invention described below) which determines shapes of the objects, and the shape determination unit is deactivated when it is determined that it is raining around the vehicle by the weather detection unit.

According to the device for monitoring around a vehicle described above, when it is determined that the weather around the vehicle is rain by the weather detection unit, the shape determination process is stopped so that errors in the determination process using the pedestrian recognition unit may be prevented due to the unclear shape of objects caused by attachment of raindrops on the surface of the lenses of a camera. Accordingly, accuracy in detecting a pedestrian may be improved, when it is determined that it is raining around the vehicle, by preventing errors in detecting a pedestrian based on the shape of the objects.

BRIEF DESCRIPTION OF THE DRAWINGS

Some of the features and advantages of the invention have been described, and others will become apparent from the detailed description which follows and from the accompanying drawings, in which:

FIG. 5 is a flowchart for explaining an alarm determination process according to the embodiment of the present invention;

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Figure 1:
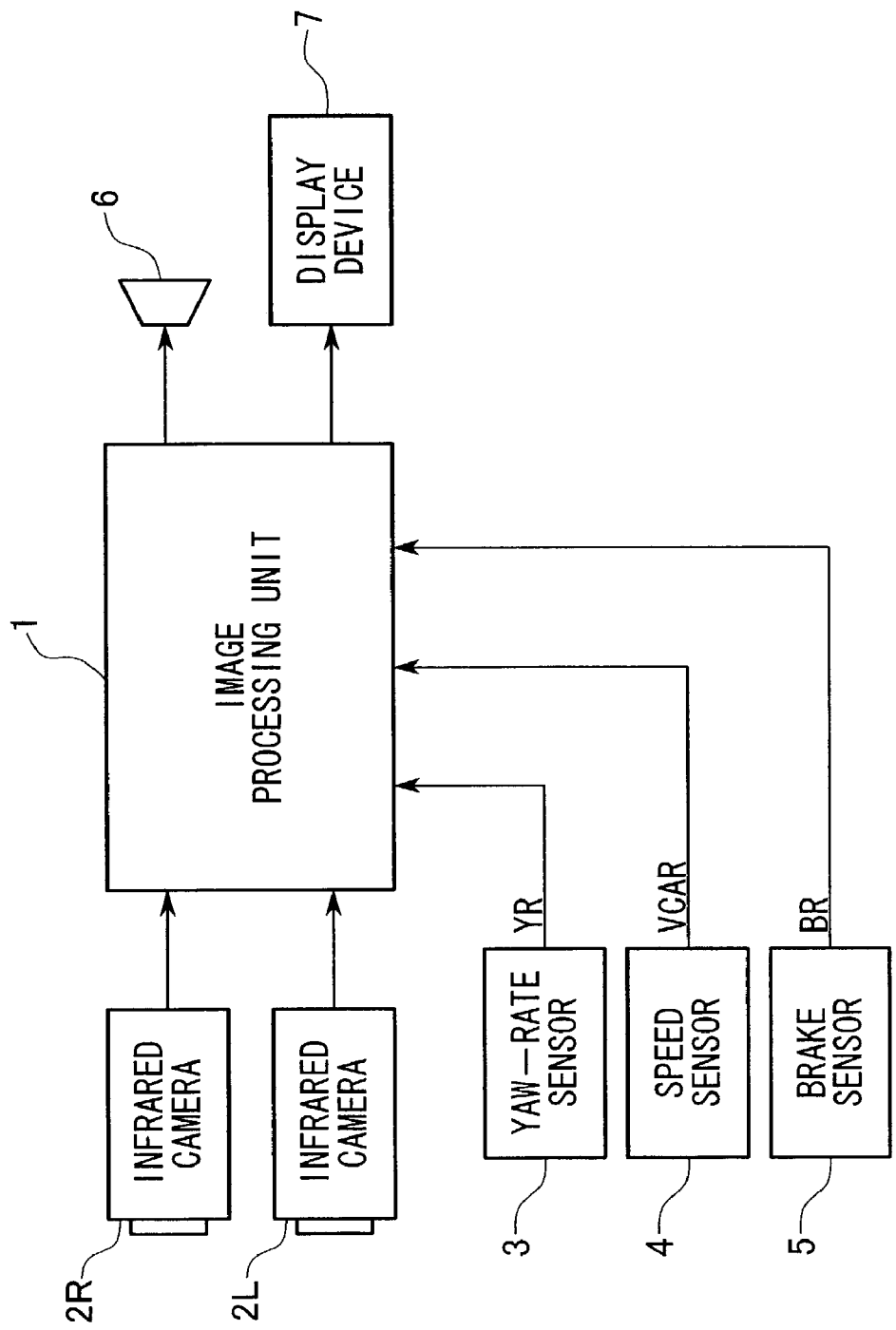
FIG. 1 is a block diagram showing a structure of a device for monitoring around a vehicle according to an embodiment of the present invention.

FIG. 1 is a block diagram showing a configuration of a device for monitoring around a vehicle according to an embodiment of the present invention.

In FIG. 1, the reference numeral 1 indicates an image processing unit including a central processing unit (CPU) which controls the device for monitoring around a vehicle according to the embodiment. To the image processing unit 1, two infrared cameras 2R and 2L capable of detecting far infrared radiations, a yaw-rate sensor 3 which detects the yaw-rate of the vehicle, a speed sensor 4 which detects the running rate (speed) of the vehicle, and a brake sensor 5 for detecting brake operation are connected. In this configuration, the image processing unit 1 detects pedestrians or animals in front of the vehicle based on an infrared image around the vehicle and signals indicating the running state of the vehicle, and generates an alarm when it is determined that the possibility of collision is high.

Also, to the image processing unit 1, a speaker 6 for generating an alarm sound, and an image display device 7, which displays images captured by the infrared cameras 2R and 2L and makes the driver of the vehicle recognize objects which may be hit by the vehicle, are connected. The image display device 7 may include, for instance, a display combined with a meter which shows the driving state of the vehicle using numbers, a navigation display provided with the console of the vehicle, and/or a heads up display (HUD) 7a which displays information at a position in the front window where the sight of the driver is not interfered with.

Moreover, the image processing unit 1 may further include an A/D converting circuit which converts input analog signals into digital signals, an image memory which stores digitalized image signals, a central processing unit (CPU) which performs various operations, a random access memory (RAM) which is used for storing data being operated by the CPU, a read only memory (ROM) which stores programs, tables, maps, etc., performed by the CPU, and output circuits through which driving signals for the speaker 6, display signals for the HUD 7a, etc., are output. Accordingly, signals output from each of the infrared cameras 2R and 2L, the yaw-rate sensor 3, the speed sensor 4 and the brake sensor 5 are converted to digital signals and are input into the CPU.

Figure 2:
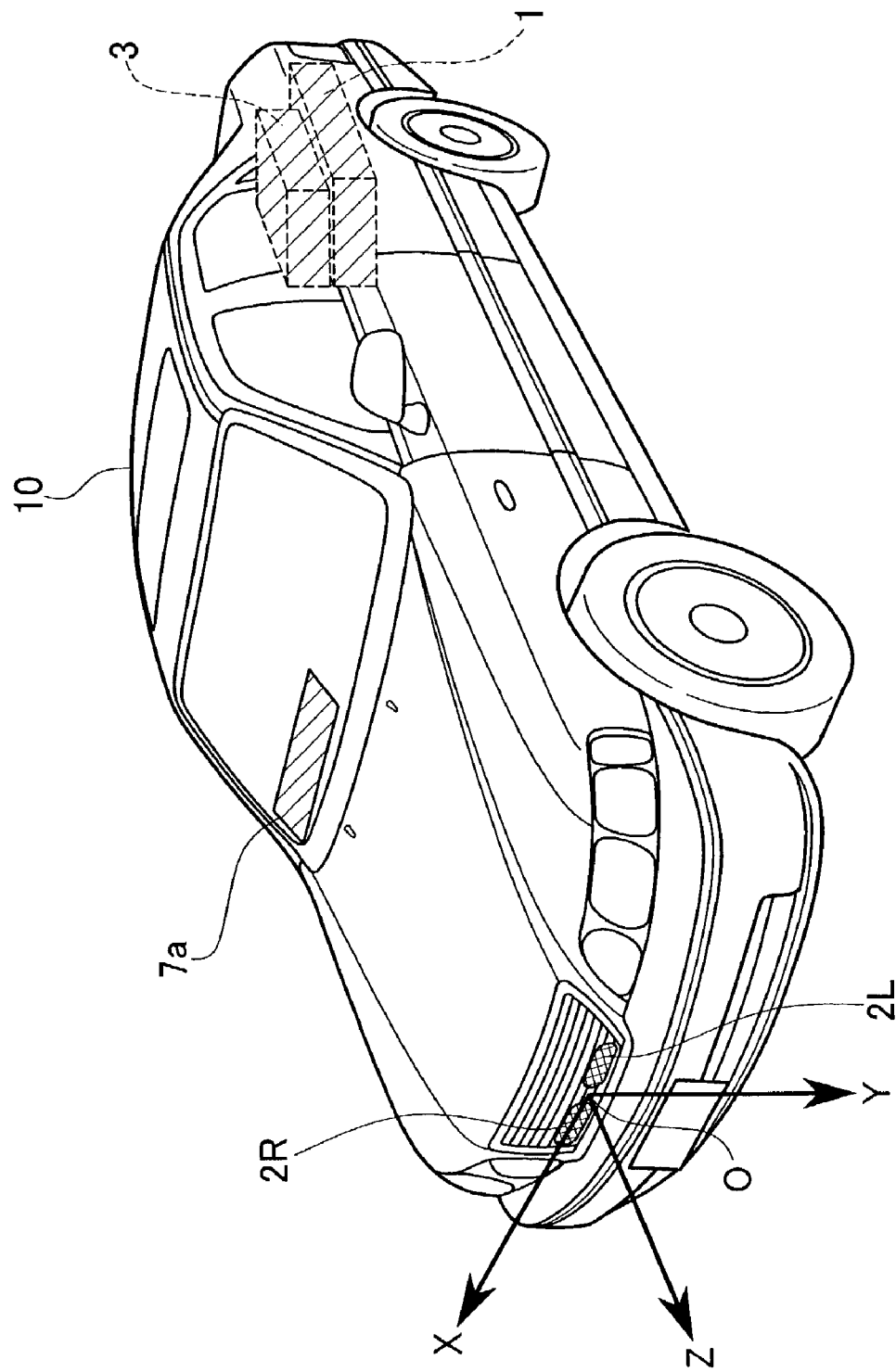
FIG. 2 is a diagram showing positions of an infrared ray camera, a sensor, a display, etc., attached to a vehicle according to the embodiment of the present invention.

Also, as shown in FIG. 2, the infrared cameras 2R and 2L are disposed at the front of a vehicle 10 at symmetrical positions with respect to the center of the vehicle 10 in the width direction so that the optical axis of each of the infrared cameras 2R and 2L become parallel to each other, and the height of the cameras 2R and 2L from the surface of the road become equal. Note that each of the infrared cameras 2R and 2L has characteristics such that the level of output signal becomes higher (i.e., luminance increases) as the temperature of an object increases.

Moreover, the display panel of the HUD 7a is disposed at a position of the windshield of the vehicle 10 where the sight of the driver is not interfered with the display panel.

Next, operation of the device for monitoring around a vehicle according to the embodiment of the present invention will be explained with reference to the accompanying drawings.

Figure 3:
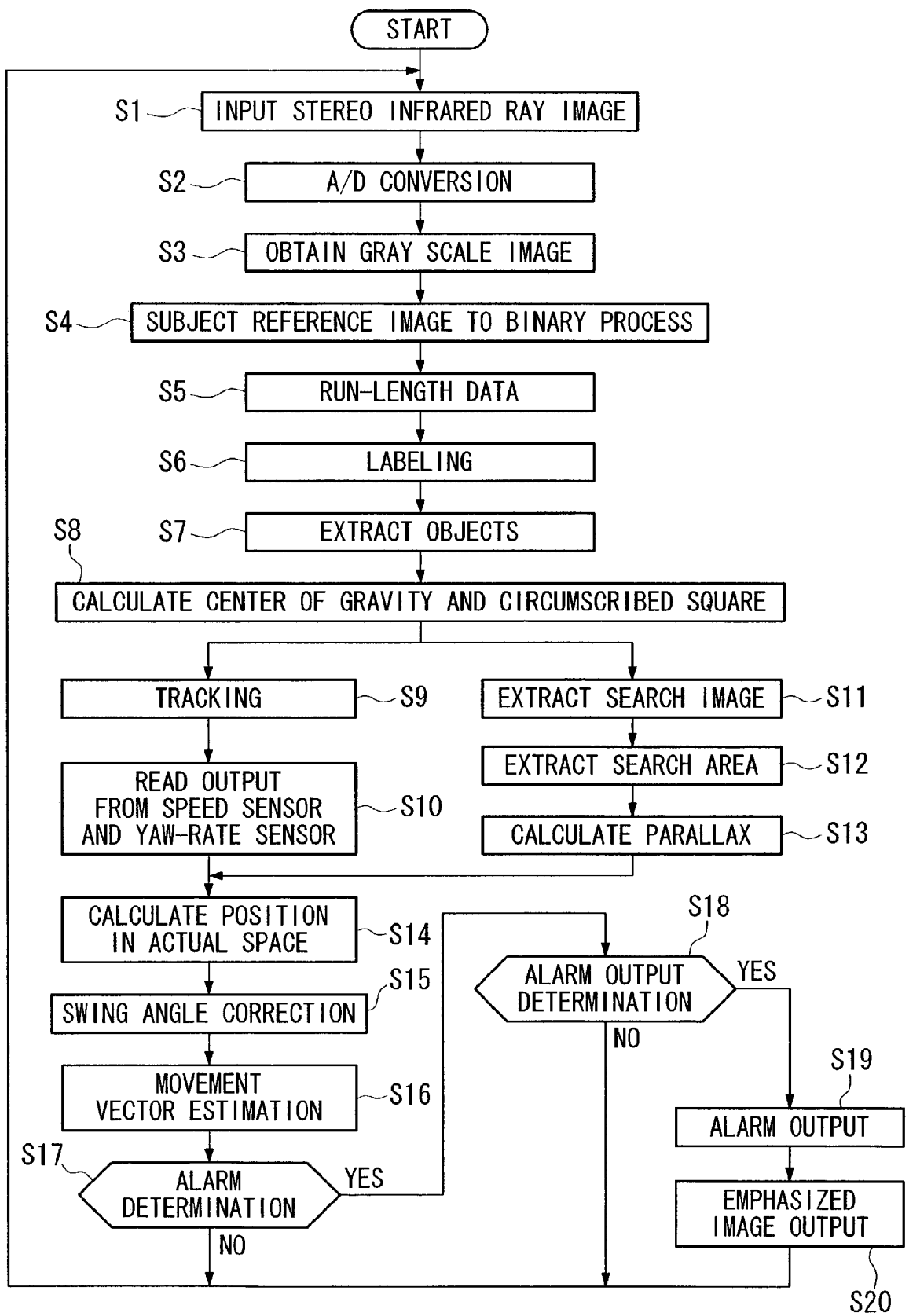
FIG. 3 is a flowchart for showing an object detection and alarming operation of the device for monitoring around a vehicle according to the embodiment of the present invention.

FIG. 3 is a flowchart showing operations for detecting a targeting object, such as a pedestrian, and for generating an alarm, which are performed in the image processing unit 1 of the device for monitoring around a vehicle according to the embodiment of the present invention.

First, the image processing unit 1 obtains an infrared image (step S1), which is output signals from the infrared cameras 2R and 2L, subjects the signals to an A/D conversion process (step S2), and stores the obtained gray scale image in an image memory (step S3). Note that in this embodiment, the right hand side image is obtained by the infrared camera 2R, and the left hand side image is obtained by the infrared camera 2L. Also, since the horizontal position of the same object in the right hand side image and the left hand side image is shifted from each other when the images are displayed, it is possible to calculate the distance to the targeting object based on the shift (parallax).

After the gray scale image is obtained in step S3, the right hand side image obtained by the infrared camera 2R is used as a reference image, and the image signals thereof is subjected to a binary thresholding process, i.e., a process in which an area whose luminance is higher than a threshold value ITH is set to be "1" (white), and an area whose luminance is less than the threshold value ITH is set to be "0" (black) (step S4).

Figure 4A:
FIGS. 4A and 4B are diagrams showing a gray scale image obtained by using an infrared camera, and a binary image thereof, respectively.
Figure 4B:

FIG. 4A shows a gray scale image obtained using the infrared camera 2R, and an image shown in FIG. 4B is obtained by subjecting the gray scale image shown in FIG. 4A to the binary thresholding process. Note that in FIG. 4B, objects indicated in each of the frames P1–P4 are targeted objects (hereinafter also referred to as "high luminance areas"), which are shown in white in the displayed picture.

After image data subjected to the thresholding process is obtained from the infrared image, a process is performed in which the obtained imaged data is converted to run-length data (step S5). Lines that are expressed by the run-length data are formed by areas that have become white due to the thresholding process at pixel level. Each of the lines has a width of one pixel in the y-direction, and has a length corresponding to the length of a pixel which forms the run-length data in the x-direction.

Next, objects in the image data converted to the run-length data are labeled (step S6) so that an extraction process for the objects may be carried out (step S7). That is, among the lines expressed as the run-length data, by regarding a line having a portion superimposed in the y-direction as an object, each of the high luminance areas P1–P4 shown in FIG. 4B, for example, can be recognized as a targeted object (targeted binary object).

After the extraction of the targeted objects is completed, the center of gravity G, the surface area S, and the aspect ratio (ratio of length to width) of a circumscribed square are calculated (step S8).

In this embodiment, the surface area S is calculated by assuming the run-length data of an object of label A as (x [i], y [i], run [i], A) (i=0, 1, 2, . . . N−1), and accumulating the lengths of the run-length data (run [i]−1) for the same object (N run-length data). Also, the coordinates (xc, yc) of the center of gravity G of the object A is calculated by multiplying the length of each run-length data (run [i]−1) by the coordinate x[i] or y[i] of each of the run-length data, further multiplying the resultant value by each other for the same object, and dividing the obtained value by the surface area S.

Moreover, the aspect ratio is calculated as the ratio of Dy/Dx where Dy is the length of the circumscribed square for the object in the longitudinal direction, and Dx is the length of the circumscribed square for the same object in the transverse direction.

Note that since the run-length data is expressed as a pixel number (a coordinate number) (=run [i]), it is necessary to subtract one to obtain the actual length (=run [i]−1). Also, it is possible to substitute the position of the center of gravity of the circumscribed square for the position of the center of gravity G After the center of gravity, the surface area, and the aspect ratio of the circumscribed square are calculated, and a process for tracking the object in relation to time, i.e., a process in which the same object is recognized every sampling period, is carried out (step S9). In the tracking process in relation to time, objects A and B are extracted at time k, which is obtained by discretization of analog time t using the sampling period, for instance, and it is determined that if objects C and D, which are extracted at time (k+1), are the same objects as the objects A and B, respectively. Then, if it is determined that the objects A and B and the objects C and D are the same objects, labels of the objects C and D are changed to label A and B, respectively, to carry out the tracking process in relation to time.

Also, the positional coordinates of each of the (center of gravity of) objects thus recognized are stored in memory as time series positional data, and are used for the subsequent operation process.

Note that the processes in steps S4–S9 explained above are carried out for the binary reference image (the right hand side image in this embodiment).

Then, the vehicle speed VCAR detected by the speed sensor 4, and the yaw-rate YR detected by the yaw-rate sensor 3 are read, and the swinging angle θ r of the vehicle 10 is calculated by subjecting the yaw-rate YR to time integration (step S10).

On the other hand, a process for calculating the distance z between the targeting object and the vehicle 10 (steps S11–S13) is carried out simultaneously with the process of steps S9 and S10. Since this process for calculating the distance z takes a longer time period than the time required in steps S9 and S10, it is carried out using longer time than steps S9 and S10 (about three times longer than the time for carrying out steps S1–S10, for instance).

First, one of the objects which are tracked using the binary image of the reference image (the right hand side image), is selected to extract a search image R1 (in this embodiment, the whole area surrounded by the circumscribed square is regarded as the search image) from the right hand side image (step S11).

Then, a search area from which an image corresponding to the search image R1 (hereinafter also referred to as a "corresponding image") is searched, is set in the left hand side image, and the corresponding image is extracted by carrying out a correlation operation (step S12). More specifically, a search area R2 is set in the left hand side image in accordance with each peak coordinate of the search image R1, and a luminance difference-summed value C (a, b), which shows the degree of correlation with the search image R1 within the search area R2, is calculated. The area at which the summed value C (a, b) is minimum is extracted as the corresponding image. Note that the correlation operation is performed using the gray scale image, not the binary image.

Also, when there is a previous positional data for the same object, an area R2a, which is narrower than the search area R2, is set as a search area based on the previous positional data.

Since the search image R1 and the corresponding image R4, which corresponds to the search image R1, are extracted in the reference image (the right hand side image) and the left hand side image, respectively, in step S12, the position of the center of gravity of the search image R1 and that of the corresponding image R4, and the degree of parallax Δd (pixel number) are obtained, and the distance z between the vehicle 10 and the object may be calculated using these factors (in step S13).

Then, after the calculation of the swing angle θ r in step S10, and the calculation of the distance between the object in step S13 are completed, the coordinate (x, y) in the image and the distance z are converted to obtain the coordinate (X, Y, Z) of the real space (in step S14).

In this embodiment, the coordinate (X, Y, Z) of the real space is defined as shown in FIG. 2 with the origin O which corresponds to the middle position of the attaching positions for the infrared cameras 2R and 2L (the position fixed to the vehicle 10). The coordinate in the image, on the other hand, is defined so that the horizontal direction with respect to the origin, which is the center of the image, become x, and the vertical direction become y.

When the coordinate in the real space is obtained, a swing angle correction process for correcting the positional shift in the image caused by the swing of the vehicle 10 is carried out (in step S15). That is, if the (front portion of the) vehicle 10 is rotated in the left hand side direction at an angle of θ r from time k to (k+1), the range of the image obtained through the cameras shifts in the x direction by Δx, and this shift is corrected in the swing angle correction process.

Note that in the following explanation, the coordinate after the swing angle correction process is expressed as (X, Y, Z).

After the swing angle correction is completed for the real space coordinate, an approximation straight line LMV, which corresponds to a vector of the relative movement between the object and the vehicle 10, is obtained from N real space positional data (N=about 10, for example) subjected to the swing angle correction process, which is obtained within the monitoring period of ΔT for the same object, i.e., the time series data.

Then, the newest positional coordinate P(0)=(X(0), Y(0), Z(0)) and the positional coordinate P (N−1)=(X(N−1), Y(N−1), Z(N−1)) prior to (N−1) sampling (i.e., before time ΔT) are corrected to be on the approximation straight line LMV, and the positional coordinate after the correction, Pv(0)=(Xv(0), Yv(0), Zv(0)) and Pv (N−1)=(Xv(N−1), Yv(N−1), Zv(N−1)) are obtained.

In this manner, the relative movement vector may be obtained as a vector directed to Pv(0) from the positional coordinate Pv(N−1) (in step S16).

As explained above, according to the embodiment of the present invention, it becomes possible to more accurately estimate the possibility of collision of the vehicle against an object with decreased degree of errors in the positional detection by calculating an approximation straight line used for approximating a relative movement track of the object with respect to the vehicle 10 based on a plural number (N) of data taken from the monitoring period ΔT.

After the relative movement vector is obtained in step S16, an alarm determination process in which the possibility of collision against the detected object is determined is carried out (in step S17). The alarm determination process will be described later in detail.

In step S17, if it is determined that there is no possibility of collision of the vehicle 10 against the detected object (i.e., "NO" in step S17), the process returns to step S1 to repeat the above explained processes.

Also, if it is determined that there is a possibility of collision of the vehicle 10 with the detected object (i.e., "YES" in step S17), the process proceeds to an alarm output determination process in step S18.

In step S18, it is determined whether the alarm output determination process should be carried out, i.e., whether the alarm output should be performed, by determining whether the driver of the vehicle 10 is operating a brake based on the output BR from the brake sensor 5 (in step S18).

If the driver of the vehicle 10 is operating the brake, the acceleration Gs (deceleration direction thereof is regarded as positive) generated by the braking operation is calculated. If the acceleration Gs is greater than a predetermined threshold value GTH, it is determined that the collision will be avoided by the operation of the brake, and the alarm output determination process is terminated (i.e., "NO" in step S18). Then, the process returns to step S1 to repeat the above-explained processes.

In this manner, no alarm is generated when an appropriate brake operation is performed, and hence, it becomes possible to avoid bothering the driver.

Also, if the acceleration Gs is equal to or less than the predetermined threshold value, or if the driver of the vehicle 10 is not operating the brake (i.e., "YES" in step S18), the process immediately proceeds to step S19 and sounds an alarm for the driver by speaking, for instance, through the speaker 6, that the possibility of hitting an object is high. Moreover, the image obtained through the infrared camera 2a, for example, is output to the image display device 7 so that the approaching object may be displayed for the driver of the vehicle 10 as an enhanced image (in step S20).

Note that the predetermined threshold value GTH is a value which meets the conditions for stopping the vehicle 10 within the traveling distance shorter than the distance Zv(0) between the object and the vehicle 10 when the acceleration Gs during the braking operation is maintained as it is.

The operation for detecting the object and alarming the driver in the image processing unit 1 of the device for monitoring around a vehicle according to the embodiment of the present invention has been described. Next, the alarm determination process in step S17 of the flowchart shown in FIG. 3 will be described in detail with reference to a flowchart shown in FIG. 5

FIG. 5 is a flowchart showing the operation of the alarm determination process according to the embodiment of the present invention.

Figure 6:
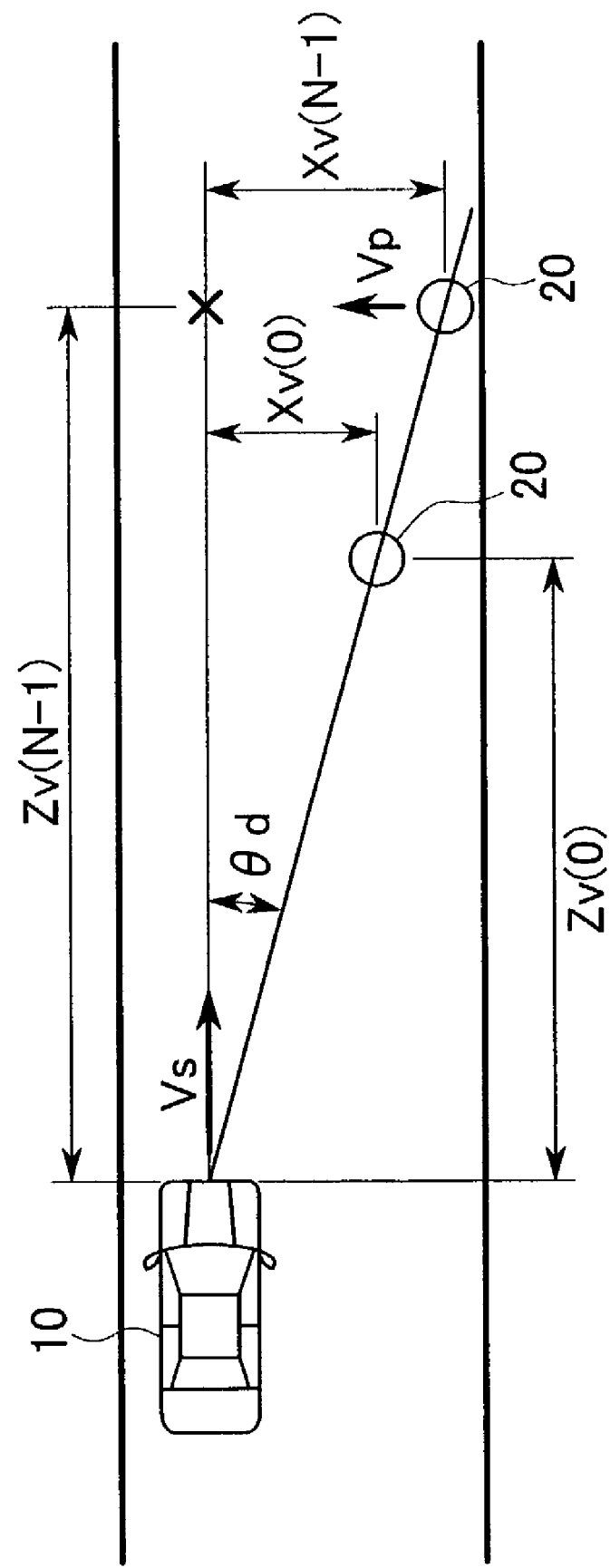
FIG. 6 is a diagram showing places where collision of a vehicle is likely to occur.

The alarm determination process is a process in which the possibility of collision of the vehicle 10 with a detected object is determined based on the following collision determination process, process for determining whether an object is within an approach determination area, entering collision determination process, pedestrian determination process, and artificial structure determination process. This will be explained using an example in which an object 20 proceeds at a speed Vp at an angle of almost 90° with respect to the traveling direction of the vehicle 10 as shown in FIG. 6.

In the flowchart shown in FIG. 5, the image processing unit 1 first carries out the collision determination process (in step S31). The collision determination process is a process in which, when the object 20 approaches the vehicle 10 from the distance Zv (N−1) to the distance Zn (0) within the time ΔT as shown in FIG. 6, the relative speed Vs with respect to the vehicle 10 in the Z direction is obtained, and it is determined whether the object will be hit by the vehicle 10 within a marginal time T assuming that the object 20 and the vehicle 10 keep moving while maintaining the relative speed Vs and the range of height H. Here, the marginal time T is provided so that the determination of the possibility of collision may be made before the estimated collision time with the margin of the time T. Accordingly, the marginal time T is set to be about 2 to 5 seconds, for example. Also, the height H is a predetermined height for defining the range in the height direction, and the height H may be set so as to be twice the height of the vehicle 10, for example.

Figure 7:
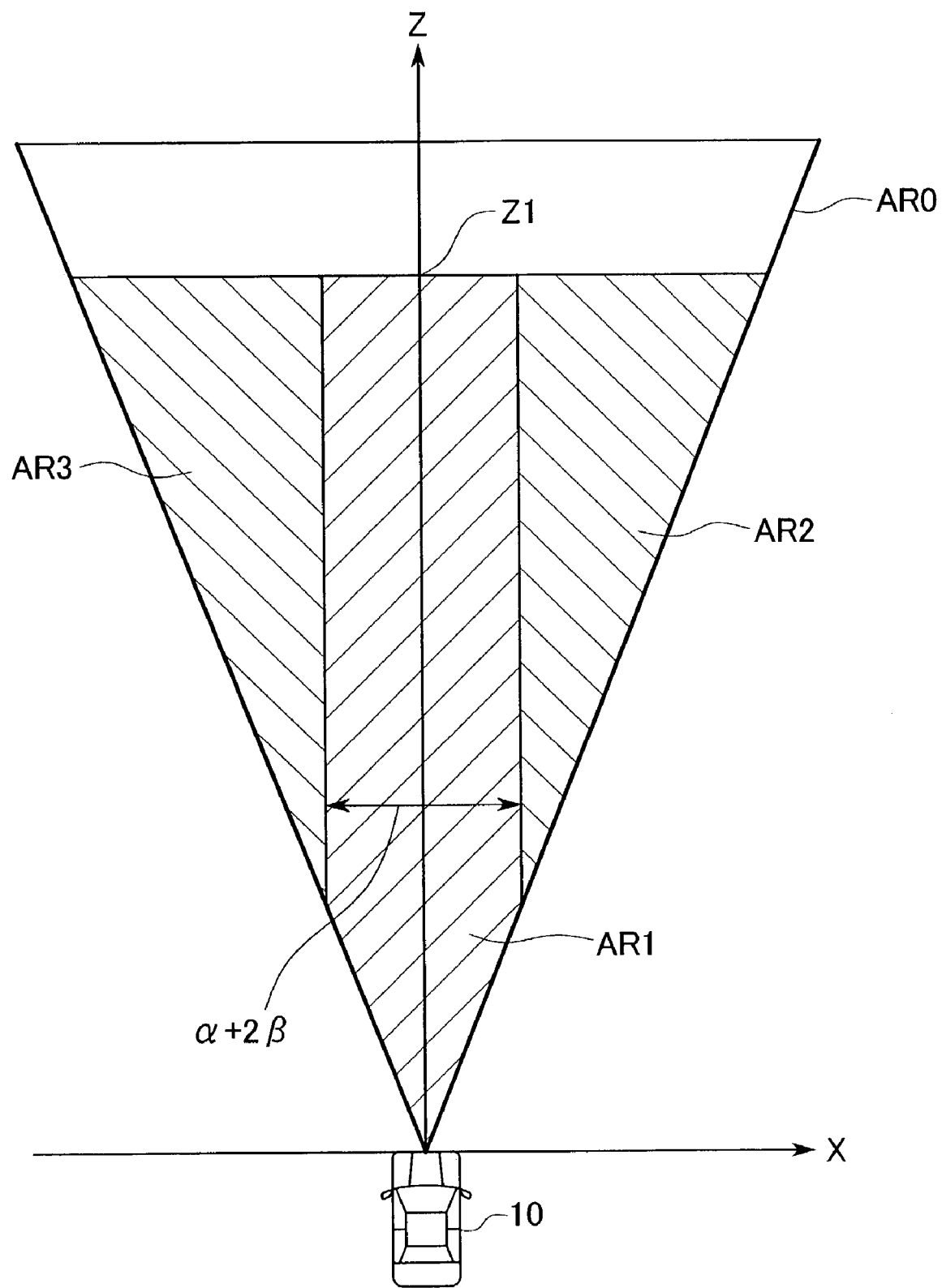
FIG. 7 is a diagram showing areas and sections in front of a vehicle according to the embodiment of the present invention.

Next, in step S31, if there is a possibility of collision between the vehicle 10 and the object within the marginal time T (i.e., "YES" in step S31), the image processing unit 1 carries out the process in which whether the object is in an approach determination area (in step S32) is determined in order to further improve the reliability in determination. The process for determining whether the object is in an approach determination area is a process in which it is determined whether the object is present in an approach determination area AR1 shown in FIG. 7 where the possibility of collision against the vehicle 10 is extremely high if the object remains there. As shown in FIG. 7, the approach determination area AR1, together with entering determination areas AR2 and AR3, is defined to be an area within a triangle area AR0 indicated by the solid line which shows an area that can be monitored using the infrared cameras 2R and 2L, and is nearer to the vehicle 10 with respect to the line indicating Z1=Vs×T. Among the areas AR1, AR2, and AR3, the approach determination area AR1 corresponds to an area having a width of α+2β where α is the width of the vehicle 10 and β is a margin (about 50 to 100 cm, for example) added to both sides of the width α of the vehicle 10 as shown in FIG. 7. Note that the approach determination area AR1 also has the predetermined height H.

In step S32, if it is determined that no object is present in the approach determination area AR1 (i.e., "NO" in step S32), the image processing unit 1 carries out the entering collision determination process in which it is determined whether there is a possibility that an object will enter the approach determination area AR1 and be hit by the vehicle 10 (in step S33). As shown in FIG. 7, in the entering determination areas AR2 and AR3, the absolute value of the X coordinate is larger than that of the above-mentioned approach determination area AR1, and the entering collision determination process is a process in which it is determined whether an object present in the area AR2 or AR3 may move and enter the approach determination area AR1 and may be hit by the vehicle 10. Note that each of the entering determination areas AR2 and AR3 also have the predetermined height H.

On the other hand, if an object is present in the approach determination area in step S32 (i.e., "YES" in step S32), the image processing unit 1 carries out the pedestrian determination process in which it is determined whether there is a possibility that the object is a pedestrian (in step S34). The pedestrian determination process will be described later in detail.

Also, if it is determined that there is a possibility that the object is a pedestrian in step S34 (i.e., "YES" in step S34), the artificial structure determination process in which it is determined whether the object is a pedestrian or not (in step S35) in order to increase the reliability in determination is carried out. The artificial structure determination process is a process in which the object is determined to be an artificial structure if the following characteristics, which cannot be present for a pedestrian, are detected in the image of the object, and the object is excluded from objects requiring an alarm to be sounded:

(1) when the image of the object contains a portion indicating an edge with a straight line;
(2) when a corner of the image of the object is a right angle corner;
(3) when the image of the object contains a plurality of portions of the same shape, and
(4) when the image of the object matches the shape of the artificial objects previously registered.

Accordingly, in the above-mentioned step S33, if there is a possibility that an object will enter the approach determination area and collide with the vehicle 10 (i.e., "YES" in step S33), and if the object which is determined to be a possible pedestrian is not an artificial structure in step S35 (i.e., "NO" in step S35), the image processing unit 1 determines that there is a possibility of collision between the vehicle 10 and the detected object (i.e., the object is regarded as an object requiring an alarm to be sounded) in step S36, and the process proceeds to step S18 (via "YES" in step S17) to perform the alarm output determination process (in step S18).

On the other hand, if it is determined that there is no possibility of collision between the vehicle 10 and the object within the marginal time T in the above-mentioned step S31 (i.e., "NO" in step S31), or if there is no possibility that the object will enter the approach determination area and collide with the vehicle 10 in step S33 (i.e., "NO" in step S33), or if it is determined in step S34 that there is no possibility that the object is a pedestrian (i.e., "NO" in step S34), or if the object determined to be a possible pedestrian in step S35 is an artificial structure (i.e., "YES" in step S35), the image processing unit 1 determines that there is no possibility of collision between the vehicle 10 and the object (i.e., the object is not an object requiring an alarm to be sounded) in step S37, and the process returns to step S1 via "NO" in step S17 shown in FIG. 3. In this manner, the operation for detecting and sounding alarms for objects, such as a pedestrian, is repeated.

Next, the pedestrian determination process in step 34 of the flowchart shown in FIG. 5 will be explained in detail with reference to flowcharts shown in FIGS. 8 through 13. FIGS. 8 through 13 are flowcharts showing the pedestrian determination process according to the embodiment of the present invention.

Figure 8:
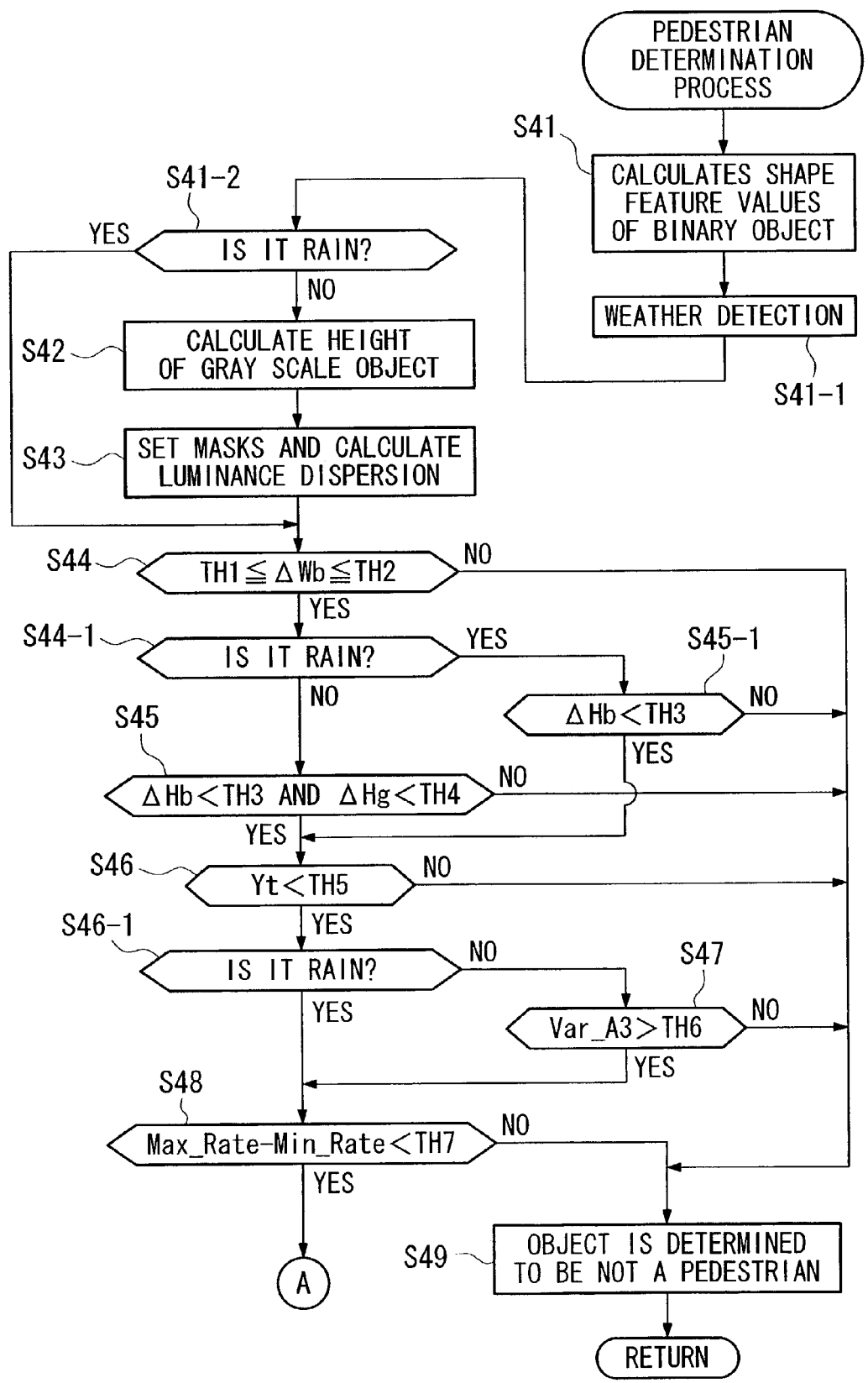
FIG. 8 is a flowchart for explaining a pedestrian determination process according to the embodiment of the present invention.
Figure 14:
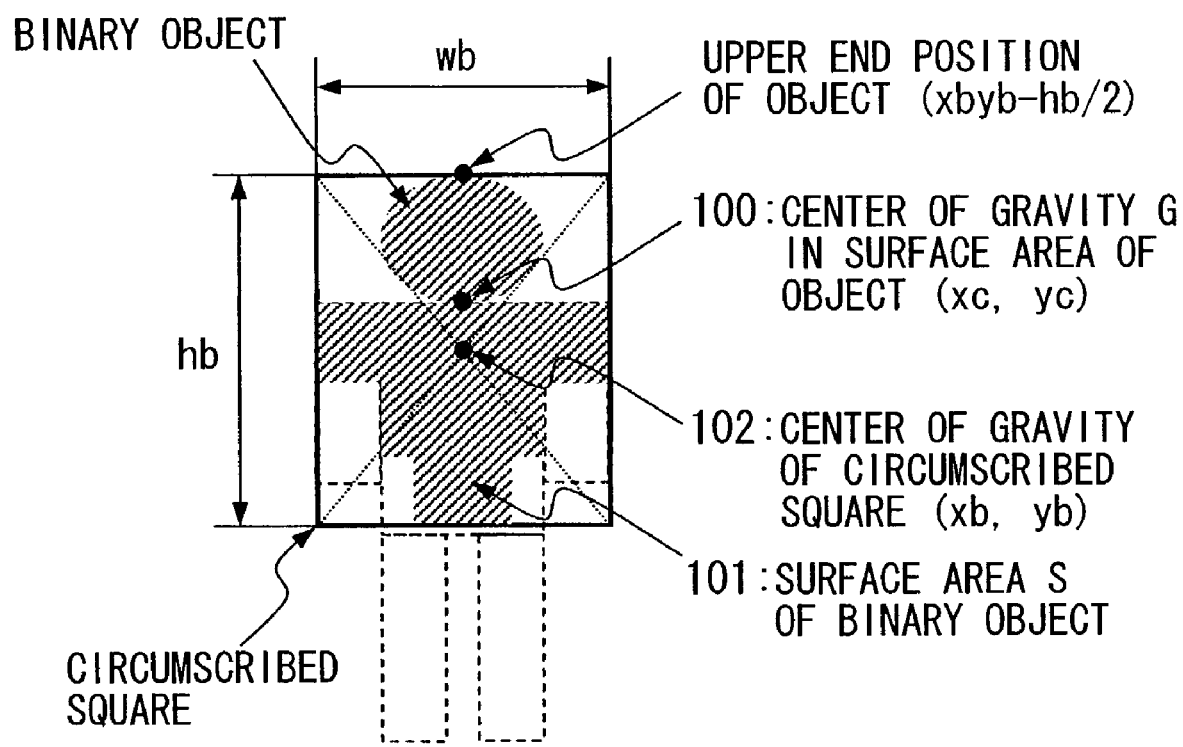
FIG. 14 is a diagram showing shape feature values of a binary object according to the embodiment of the present invention.

As shown in the flowchart shown in FIG. 8, the image processing unit 1 calculates shape feature values of a binary object (step S41), which show characteristics in shape of a binary object in real space, based on the center of gravity G (xc, yc) of the binary object calculated in step S8 in the flowchart shown in FIG. 3 (i.e., the center of gravity G100 of the binary object shown in FIG. 14), the surface area S (the surface S101 of the binary object shown in FIG. 14), the aspect ratio of the circumscribed square for the object, and the distance z between the vehicle 10 and the object calculated in step S13, in addition to the height hb and the width wb of the circumscribed square of the binary object shown in FIG. 14, and the barycentric coordinates (xb, yb) of the circumscribed square (i.e., the center of gravity 102 of the circumscribed square shown in FIG. 14). Note that the shape feature values of the binary object are calculated using the length D (m) of a baseline of the camera, the focal length f (m) of the camera, the pixel pitch p (m/pixel), and the parallax amount $\Delta d$ (pixel) calculated using the correlation matching of the right and left images.

More specifically, since the rate between the circumscribed square and the surface area of the object may be expressed as:

$$\text{Rate} = S/(hb \times wb) \tag{1}$$

the aspect (Asp) of the circumscribed square, which indicates the ratio of the length to the width of the circumscribed square, may be expressed as:

$$Asp = hb/wb \tag{2}$$

and the distance z between the vehicle 10 and the object may be expressed as:

$$z = (f \times D)/(\Delta d \times p) \tag{3},$$

the width $\Delta Wb$ and the height $\Delta Hb$ of the binary object in the real space may be calculated as:

$$\Delta Wb = wb \times z \times p/f$$

$$\Delta Hb = hb \times z \times p/f \tag{4}$$

the barycentric coordinates (Xc, Yc, Zc) of the binary object may be calculated as:

$$Xc = xc \times z \times p/f$$

$$Yc = yc \times z \times p/f$$

$$Zc = z \tag{5}$$

the barycentric coordinates (Xb, Yb, Zb) of the circumscribed square for the binary object _ps may be calculated as:

$$Xb = xb \times z \times p/f$$

$$Yb = yb \times z \times p/f$$

$$Zb = z \tag{6}$$

and the upper end positional coordinates (Xt, Yt, Zt) of the binary object may be calculated as:

$$Xt = xb \times z \times p/f$$

$$Yt = yb \times z \times p/f - \Delta Hb/2$$

$$Zt = z \tag{7}.$$

After the shape feature values for the binary object are calculated, a weather detection process is carried out in which the weather around the vehicle 10 is detected (step S41-1).

Figure 17A:
FIGS. 17A and 17B are diagrams showing an example of a gray scale image taken by a device for monitoring around a vehicle according to the embodiment of present invention on fine day (FIG. 17A) and rainy day (FIG. 17B).
Figure 17B:
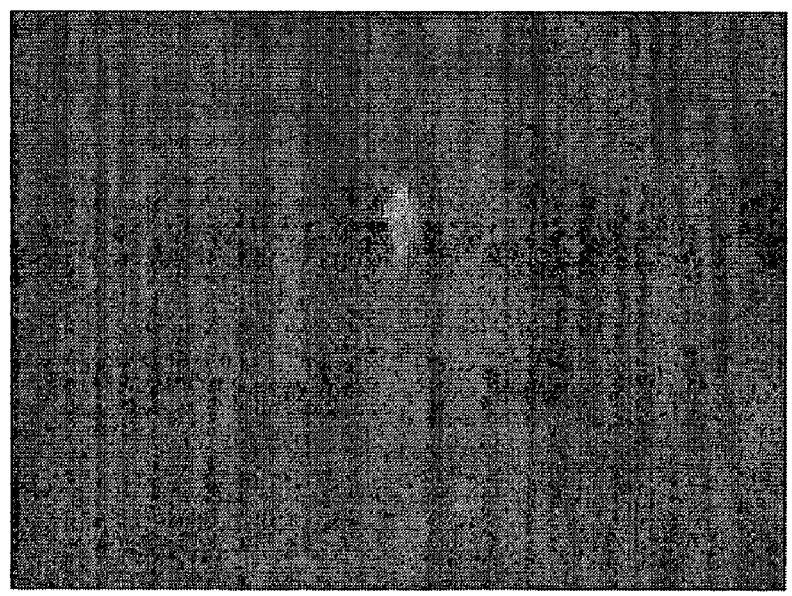

The weather detection process is a process in which a luminance histogram is obtained for a gray scale image which was obtained using the infrared camera 2R, for instance, and the weather around the vehicle 10 is determined based on the luminance histogram. In particular, the weather detection process is a process to determine whether it is raining around the vehicle 10. More specifically, referring to FIGS. 17A and 17B, since the amount of infrared rays emitted from an object differs due to the temperature decrease caused by rain, and hence differences are generated between the gray scale image taken on a non-rainy day as shown in FIG. 17A and the gray scale image taken on a rainy day as shown in FIG. 17B, results as shown in a graph in FIG. 18 are obtained by calculating the luminance histogram of each.

Figure 18:
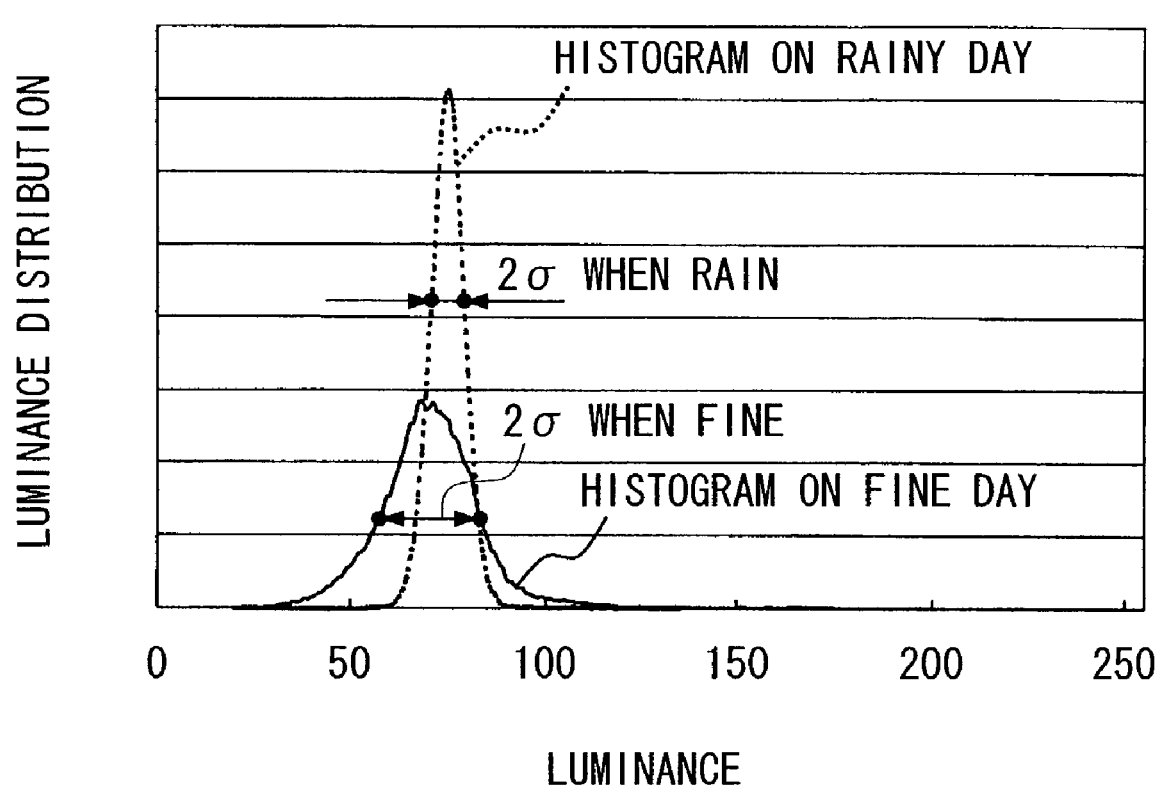
FIG. 18 is a graph showing a histogram of the gray scale image on fine day and that on rainy day in comparison.

FIG. 18 shows the graph in which the histogram of the gray scale image on a non-rainy day and that on rainy day are compared. As shown in FIG. 18, the standard deviation σ of the luminance histogram for the entire image tends to become small (i.e., the distance between 2 σ becomes small) on the rainy day as compared to that on a non-rainy day. Accordingly, when the standard deviation σ of the luminance histogram for the entire image is less than the threshold value TH of 24, it is determined that it is raining around the vehicle 10.

Note that the determination of weather around the vehicle 10 is not necessary based on the above-mentioned luminance histogram of a gray scale image, and it is possible to determine the weather around the vehicle 10 based on signals from a raindrop sensor provided with the vehicle 10 for detecting rain, or signals for controlling the operation of a wiper for wiping off the raindrops on the windshield (for instance, the ON/OFF signals of the wiper).

After the weather around the vehicle 10 is determined in step S41-1, it is determined that it is or it is not raining around the vehicle 10 (in step S41-2).

If it is determined that it is not raining around the vehicle 10 in step S41-2 (i.e., "NO" in step 41-2), then the height of the object in the gray scale image containing the binary object extracted in step S7 is obtained using the gray scale image obtained in step S3 in the flowchart shown in FIG. 3 (step S42). The height of the object in the gray scale image may be obtained by setting a plurality of mask areas of a predetermined size on the gray scale image from the upper end of the circumscribed square for the binary object, extracting an area containing the mask area as an area for the gray scale object in which the change in luminance in the mask area is large (i.e., the mask area contains the object and background image), the degree of correlation between the mask areas of the right hand side and left hand side image is high (i.e., objects of more than two are not present in the mask area), and the distance is the same as the binary object (i.e., the same parallax), and calculating the height (pixel) (expressed as "Height" in the following formula (8)) of the area for the gray scale object in the image to obtain the height ΔHg of the gray scale object using the formula (8):

$$\Delta Hg = z \times \text{Height} \times p/f \quad (8)$$

Figure 15:
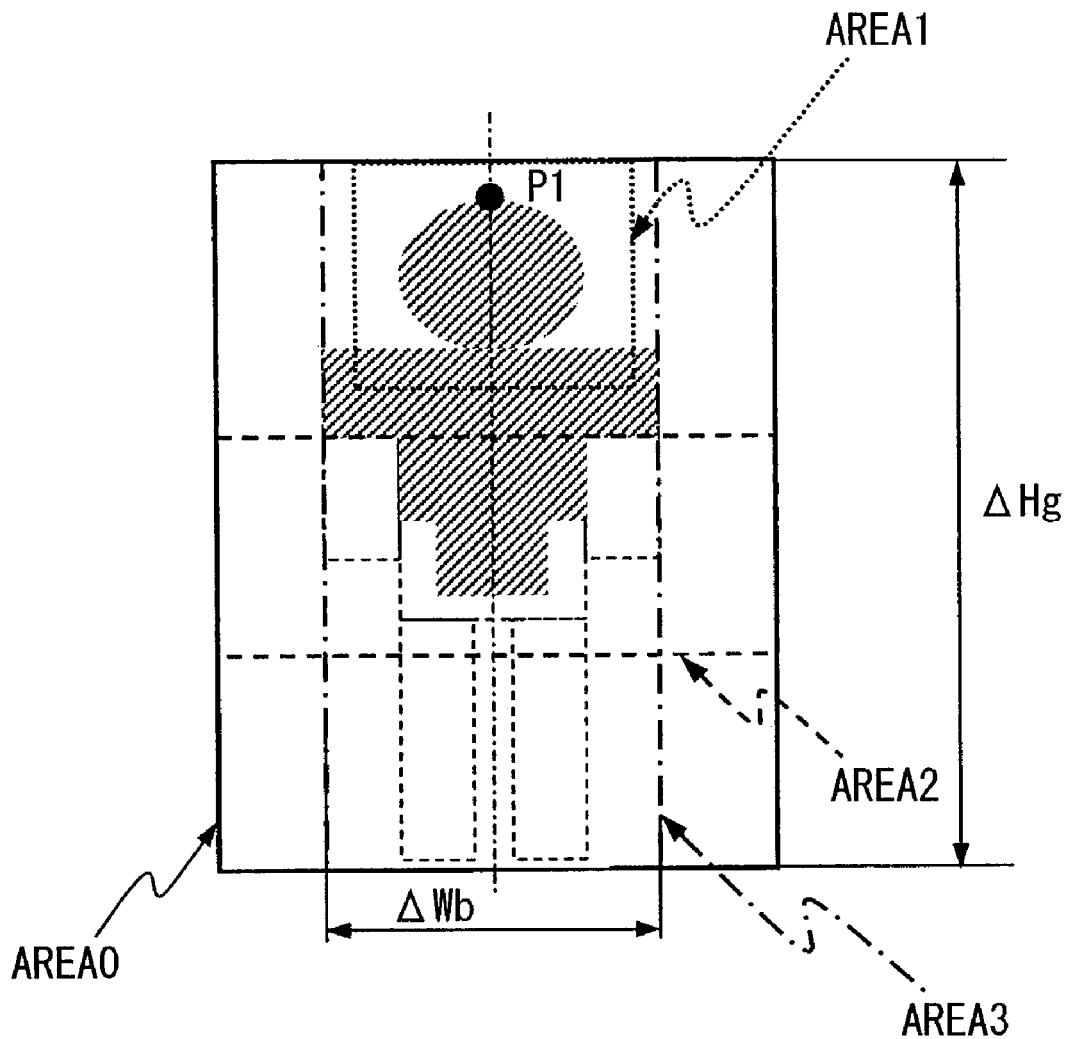
FIG. 15 is a diagram showing arrangement of mask areas according to the embodiment of the present invention.

Also, as shown in FIG. 15, the mask areas AREA1, AREA2, and AREA3 are set in the area of the gray scale object AREA0 in the image to calculate the mean luminance value and the change (dispersion) in luminance in each mask area (step S43). Here, the mean luminance value of the AREA1 is expressed as Ave_A1, and the dispersion in luminance of the AREA2 and AREA3 are expressed as Ave_A2 and Ave_A3, respectively. Note that in the following process, the AREA1 is used for the determination in the presence of a head portion of the object, the AREA2 is used for the determination in the presence of a body portion of the object, and the AREA3 is used for the determination in the presence of change in shape from the head portion to the lower half of the body portion. The AREA3 is also used, when a part of an object which is a heat-retaining object that does not generate heat by itself but retains heat which was externally applied, such as a wall, and shows a simple change in luminance is extracted by the binary process, for distinguishing the object from the pedestrian. Note that FIG. 15 is a diagram for schematically showing a pedestrian captured by a camera. In FIG. 15, the shaded area indicates a portion of the object captured by the binary process, and areas surrounded by dotted lines indicate portions of the object, the presence of which can be confirmed through the gray scale image with respect to the background thereof yet has not been revealed by the binary process. Also, the size of each portion shown in FIG. 15 is an example of the size of the portion in the real space.

After the settings in the mask areas AREA1, AREA2, and AREA3 are completed, the determination process for a pedestrian based on the shape of the binary object, and the determination process for a pedestrian using the luminance variance in each mask area in the gray scale image is carried out.

The image processing unit 1 first determines whether the values of the height, width, mean luminance, luminance variance, etc., of the binary object are in the range appropriate for a pedestrian.

More specifically, since the objects to be detected are pedestrians, it is determined whether the threshold value TH of the width ΔWb of the binary object is in the range of (1≦TH≦2), i.e., in the range appropriate for the width of a pedestrian (in step S44).

Also, in step S41-2, if the weather around the vehicle 10 is determined to be rain (i.e., "YES" in step S41-2), the calculation of height of the object in the gray scale image in step S42 or the setting of the mask areas AREA1, AREA2, and AREA3 in step S43 are not performed, and the process proceeds to step S44. In step S44, as mentioned above, since the objects to be detected are pedestrians, it is determined if the threshold value TH of the width ΔWb of the binary object is in the range of (1≦TH≦2).

In step S44, if it is determined that the threshold value TH of the width ΔWb of the binary object is in the range of (1≦TH≦2) (i.e., "YES" in step S44), it is determined whether or not it is raining around the vehicle 10 (in step S44-1).

In step S44-1, if it is determined that the weather around the vehicle 10 is not rain (i.e., "NO" in step S44-1), it is determined whether the height ΔHb of the binary object is less than the threshold value TH3, i.e., in the range appropriate for the height of a pedestrian, and if the height ΔHg of the gray scale object is less than the threshold value TH4, i.e., in the range appropriate for the height of a pedestrian (in step S45).

On the other hand, in step S44-1, if the weather around the vehicle 10 is determined to be rain (i.e., "YES" in step S44-1), it is determined if the height ΔHb of the binary object is less than the threshold value TH3, i.e., in the range appropriate for the height of a pedestrian (in step S45-1).

In step S45, if it is determined that the height ΔHb of the binary object is less than the threshold value TH3, and that the height ΔHg of the gray scale object is less than the threshold value TH4 (i.e., "YES" in step S45), or if it is determined that the height ΔHb of the binary object is less than the threshold value TH3 in step S45-1 (i.e., "YES" in step S45-1), it is determined whether the height position Yt of the upper end of the object from the surface of the road is less than the threshold value TH5 (i.e., in the range appropriate for the height of a pedestrian) in step S46.

Also, in step S46, if the height position Yt of the upper end of the object from the surface of the road is less than the threshold value TH5 (i.e., "YES" in step S46), it is determined whether or not it is raining around the vehicle 10 (in step S46-1).

In step S46-1, if it is determined that the weather around the vehicle 10 is not rain (i.e, "NO" in step S46-1), it is determined whether the luminance variance Var_A3 of the mask area AREA3 is greater than the threshold value TH6 (in step S47). This process will be explained with reference to FIGS. 16A through 16C which show the luminance variance in the mask area AREA3 for the case where the object is a part or the a whole of a pedestrian, or a wall.

Figure 16A:
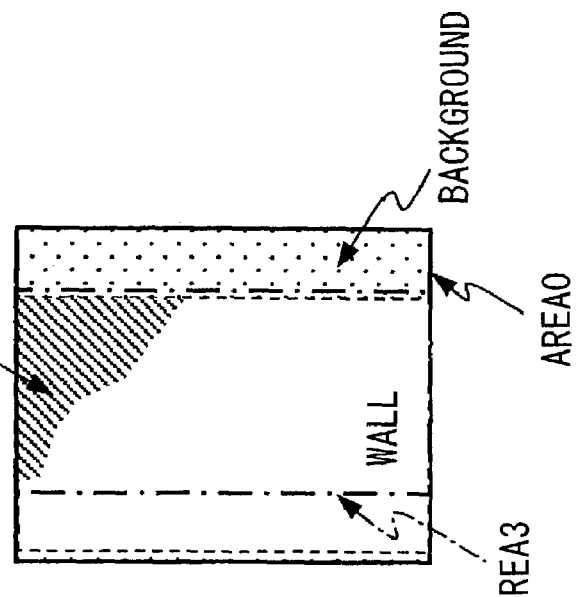
FIGS. 16A to 16C are diagrams showing luminance distribution of a mask area AREA3 for the case where the object is a part of a pedestrian, a whole of a pedestrian, and a wall, respectively.
Figure 16B:
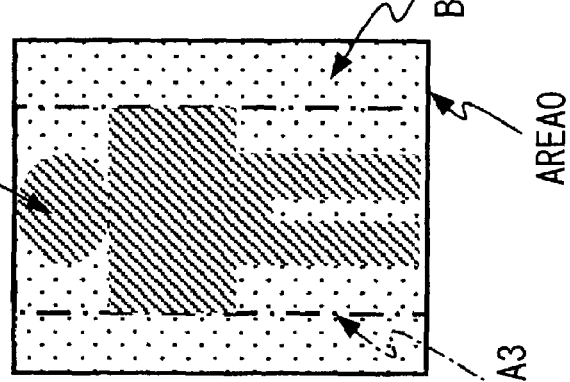
Figure 16C:
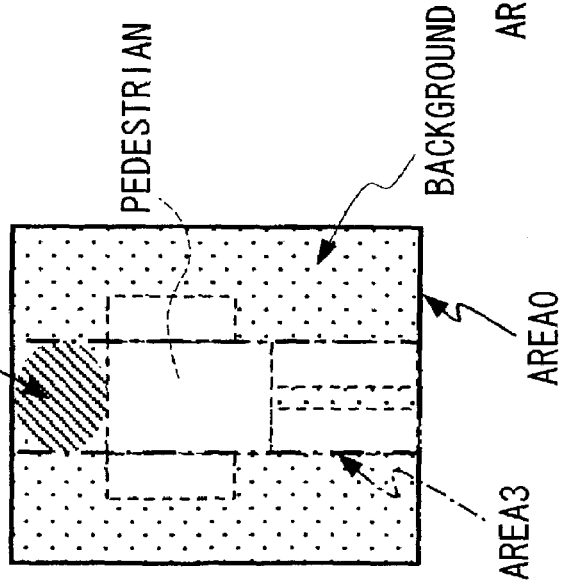

As shown in FIG. 16A, when only a head portion of a pedestrian is extracted by the binary process using the width of the mask area AREA3 as the width of the binary object, difference in the degree of luminance is caused between the head portion and the lower half of the body portion. Also, as shown in FIG. 16B, when the entire body or at least the upper half of the body of a pedestrian is extracted using the binary thresholding method, difference in the degree of luminance is generated between the body portion of the pedestrian and the background. On the other hand, as shown in FIG. 16C, for the object in which the difference in the temperature is small overall the parts of the objects, such as a wall, difference in the degree of luminance is also small between portions extracted by the binary process and portions not extracted by the binary process. Moreover, the object is formed by portions of straight lines as in the AREA3. For this reason, the luminance variance Var_A3 in the AREA3 is high for a pedestrian, and low for an object, such as a wall.

Accordingly, in step S47, it is determined if the object is a pedestrian by determining if the luminance variance Var_A3 of the mask area AREA3 is greater than the threshold value TH6.

Also, in step S47, if the luminance variance Var_A3 of the mask area AREA3 is greater than the threshold value TH6 (i.e., "YES"in step S47), the pedestrian determination process is carried out based on the change in shape of the object over time.

More specifically, since the object is a binary image of a pedestrian, it is considered that the shape of the binary image does not significantly change over time. For this reason, it is determined if the difference between the maximum value Max_Rate and the minimum value Min_Rate of the Rate, which indicates the ratio of the surface area between the circumscribed square and the binary image within a certain period of time, is less than the threshold value TH7 (in step S48).

Also, in step S46-1, if the weather around the vehicle 10 is determined to be rain (i.e., "YES" in step S46-1), the determination of the luminance variance Var_A for the mask area AREA3 in step S47 is not carried out, and the process proceeds to step S48. In step S48, as explained above, it is determined if the difference between the maximum value Max_Rate and the minimum value Min_Rate of the Rate, which indicates the ratio of the surface area between the circumscribed square and the binary object within a certain period of time, is less than the threshold value TH7 (in step S48).

On the other hand, in step S44, if the width ΔHb of the binary object is less than the threshold value TH1 or greater than the threshold value TH2 (i.e., "NO" in step S44), or in step S45, if the height ΔHb of the binary object is equal to or greater than the threshold value TH3, or if the height ΔHg of the gray scale object is equal to or greater than the threshold value TH4 (i.e., "NO" in step S45), or in step S45-1, if the height ΔHb of the binary object is equal to or greater than the threshold value TH3 (i.e., "NO" in step S45-1), or in step S46, if it is determined that the height position Yt of the upper end of the object from the surface of the road is equal to or greater than the threshold value TH5 (i.e., "NO" in step S46), it is determined that the detected object is not a pedestrian (in step S49), and the pedestrian determination process is terminated. Then, the process proceeds to step S37 in the flowchart shown in FIG. 5 (via "NO" in step S34) to determine that the detected object is not an object requiring an alarm to be raised.

Similarly, in step S47, if the luminance variance in the mask area AREA3 is equal to or less than the threshold value TH6 (i.e., "NO" in step S47), or in step S48, if the difference between the maximum value Max_Rate and the minimum value Min_Rate of the Rate, which indicates the ratio of the surface area between the circumscribed square and the binary object within a certain period of time, is equal to or greater than the threshold value TH7 (i.e., "NO" in step S48), it is determined that the detected object (or the object captured in the area AREA0) is not a pedestrian (in step S49), and the pedestrian determination process is terminated. Then, the process proceeds to step S37 in the flowchart shown in FIG. 5 (via "NO" in step S34) to determine that the detected object is not an object requiring an alarm to be sounded.

Also, in step S48, if the difference between the maximum value Max_Rate and the minimum value Min_Rate of the Rate, which indicates the ratio of the surface area between the circumscribed square and the binary object within a certain period of time, is less than the threshold value TH7 (i.e., "YES" in step S48), the image processing unit 1 then carries out the pedestrian determination process for the shape of each extracted object in further detail.

More specifically, it is determined whether the height position Yt of the upper end of the object from the surface of the road is greater than the threshold value TH8 (which is a value appropriate for the height distinguishing the upper half from the lower half of the body of a pedestrian) (in step S50).

Figure 9:
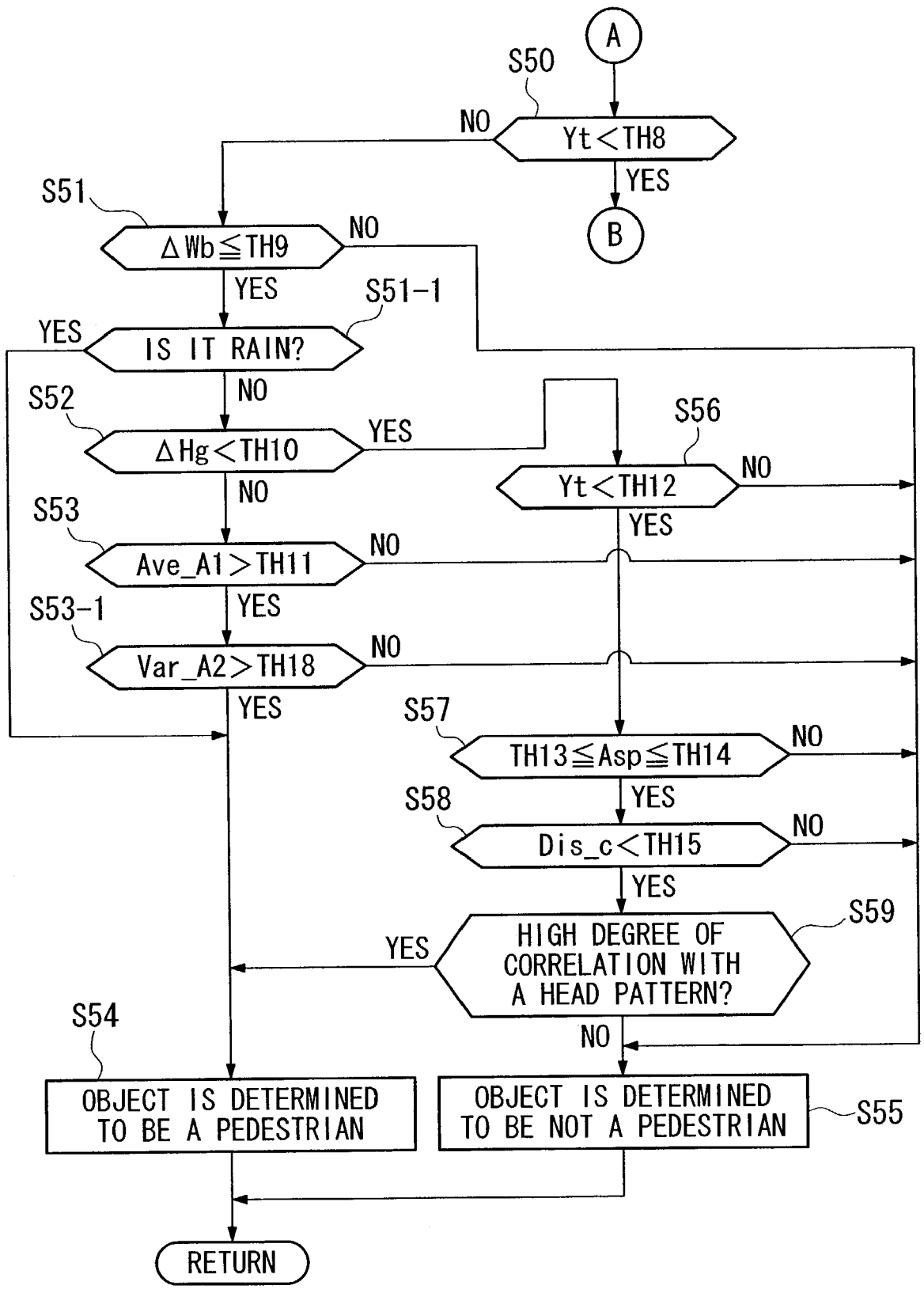
FIG. 9 is a flowchart for explaining a pedestrian determination process according to the embodiment of the present invention.

In step S50, if the height position Yt of the upper end of the object from the surface of the road is equal to or less than the threshold value TH8 (i.e., "NO" in step S51), the process proceeds to step S51 shown in the flowchart in FIG. 9. In step S51, it is determined if the width ΔWb of the binary object is equal to or less than the threshold value TH9, which is a value appropriate for the width of the body of a pedestrian) to determine if it is a lower half of the body of a pedestrian or a sitting pedestrian.

FIG. 9 is a flowchart showing the procedure for distinguishing a pedestrian whose lower half of the body is extracted by the binary process or who is sitting. In step S51 of the flowchart, if the width ΔWb of the binary object is equal to or less than the threshold value TH9 (i.e., "YES" in step S51), it is determined whether or not it is raining around the vehicle 10 (in step S51-1).

In step S51-1, if it is determined that the weather around the vehicle 10 is not rain (i.e., "NO" in step S51-1), it is determined whether the height ΔHg of the gray scale object is less than the threshold value TH10, which is a value appropriate for the height of a pedestrian, in order to determine if the object is a sitting pedestrian (in step S52).

In step S52, if the height ΔHg of the gray scale object is equal to or greater than the threshold value TH10 (i.e., "NO" in step S52), it is assumed that the object corresponds to the body or the lower half of the body of a pedestrian. Then, in order to determine if a head portion is present above the object, it is determined if the mean luminance value Ave_A1 of the mask area AREA1 shown in FIG. 15 is greater than the threshold value TH 11 (in step S53).

In step S53, if it is determined that the mean luminance value Ave_A1 of the mask area AREA1 is larger than the threshold value TH11 (i.e., "YES" in step S53), it is determined if the luminance variance Var_A2 of the mask area AREA2 is greater than the threshold value TH18 assuming that the AREA2 has a luminance pattern in the gray scale image since the body portion contains portions from which heat is not easily emitted due to the effects of wearing clothing (in step S53-1).

In step S53-1, if the luminance variance Var_A2 of the mask AREA2 is larger than the threshold value TH18 (i.e., "YES" in step S53-1), it is determined that the detected object (or the object captured in the area AREA0) is a pedestrian (in step S54), and the pedestrian determination process is terminated. Then the process proceeds to step S35 in FIG. 5 (via "YES" in step S34) to carry out the artificial structure determination process.

Also, in step S51-1, if it is determined that the weather around the vehicle 10 is rain (i.e., "YES" in step S51-1), the determination processes from steps S52 to S53-1 are not performed. Then, the process proceeds to step S54 to determine that the detected object is a pedestrian (in step S54), and the pedestrian determination process is terminated. After this, the process proceeds to step S35 shown in FIG. 5 (via "YES" in step S34) to carry out the artificial structure determination process.

On the other hand, if it is determined that the width ΔWb of the binary object is greater than the threshold value TH9 (i.e., "NO" in step S51), or in step S53, if. the mean luminance value Ave_A1 of the mask area AREA1 is equal to or less than the threshold value 11 (i.e., "NO" in step S53), or in step S53-1, if the luminance variance Var_A2 of the mask AREA2 is equal to or less than the threshold value TH18 (i.e., "NO" in step S53-1), it is determined that the detected object (or the object captured in the area AREA0) is not a pedestrian (in step S55), and the pedestrian determination process is terminated. Then, the process proceeds to step S37 in FIG. 5 (via "NO" in step S34) to determine that the object is not an object requiring an alarm to be raised.

Also, in step S52, if it is determined that the height ΔHg of the gray scale object is less than the threshold value TH1O (i.e., "YES" in step S52), the object is assumed to be a sitting pedestrian, and it is determined whether the height position Yt of the upper end of the binary object from the surface of the road is greater than the threshold value TH12, i.e., a value appropriate for the height distinguishing a sitting pedestrian from a standing pedestrian (in step S56).

In step S56, if the height position Yt of the upper end of the binary object from the surface of the road is greater than the threshold value TH12 (i.e., "YES" in step S56), it is determined if the Asp, which expresses the aspect ratio (i.e., the ratio of length to width) of a circumscribed square for the binary object, is equal to or greater than the threshold value TH13 and equal to or less than the threshold value TH14 (i.e. a value appropriate for a pedestrian) in step S57.

In step S57, if the value of Asp, which expresses the aspect ratio of a circumscribed square for the binary object, is equal to and greater than the threshold value TH13 and equal to or less than the threshold value TH14 (i.e., "YES" in step S57), it is determined if the distance Dis_c between the center of gravity in the circumscribed square 102 and the center of gravity G100 in the binary object in the real space, which may be expressed as the following equation (9), is less than the threshold value TH15, i.e., a value appropriate for a pedestrian (in step S58).

$$Dis\_c = SQRT((Xb-Xc)^2 + (Yb-Yc)^2) \quad (9)$$

In step S58, if the distance Dis_c is less than the threshold value TH15 (i.e., "YES" in step S58), it is determined if a portion having high correlation with predetermined patterns of a head portion is present in the mask area AREA1 of the binary object since objects other than a pedestrian, such as a front portion of a vehicle, may be contained in objects having the ΔWb of 1.0 m or less and the ΔHg of less than 1.0 m, for example (in step S59).

In step S59, if a portion having high degree of correlation with pre-registered patterns of a head portion is present in the mask area AREA1 of the binary object (i.e., "YES" in step S59), it is determined that the detected object (or the object captured in the area AREA0) is a pedestrian (in step S54), and the pedestrian determination process is terminated. Then, the process proceeds to step S35 in FIG. 5 (via "YES" in step S34) to carry out the artificial structure determination process.

In step S56, on the other hand, if it is determined that the height position Yt of the upper end of the binary object from the surface of the road is equal to or less than the threshold value TH12 (i.e., "NO" in step S56), or in step S57, if the value of Asp, which expresses the aspect ratio of a circumscribed square for the binary object, is less than the threshold value TH13 or greater than the threshold value TH14 (i.e., "NO" in step S57), or in step S58, if the distance Dis_c is equal to or greater than the threshold value TH15 (i.e., "NO" in step S58), or in step S59, if a portion having high degree of correlation with pre-registered patterns of a head portion is not present in the mask area AREA1 of the binary object (i.e., "NO" in step S59), it is determined that the detected object (or the object captured in the area AREA0) is not a pedestrian (in step S55), and the pedestrian determination process is terminated. Then, the process proceeds to step S37 in FIG. 5 (via "NO" in step S34), and it is determined that the object is not an object requiring an alarm to be sounded.

Figure 10:
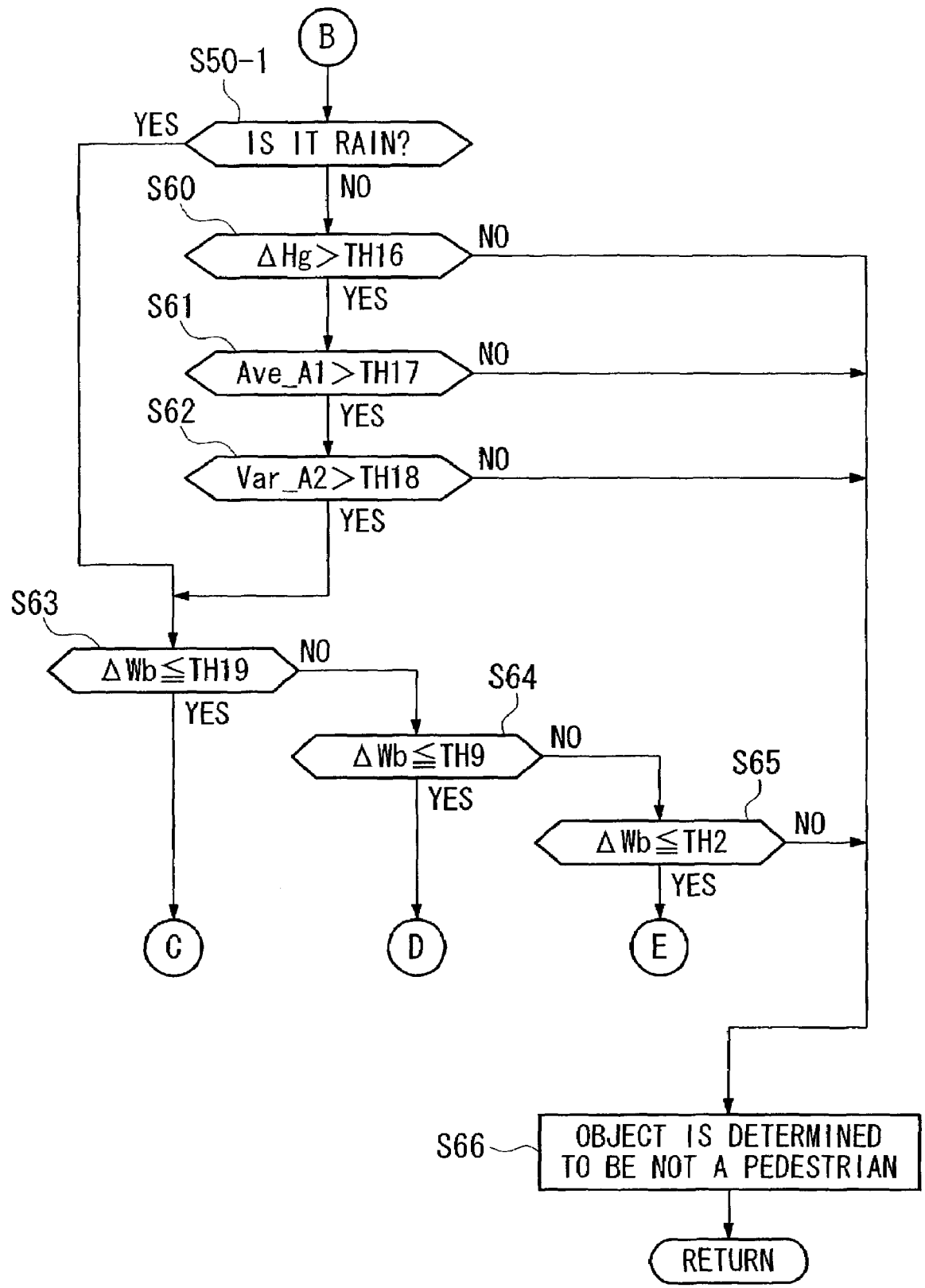
FIG. 10 is a flowchart for explaining a pedestrian determination process according to the embodiment of the present invention.

Also, in step S50 in FIG. 9, if it is determined that the height position Yt of the upper end of the object from the surface of the road is greater than the threshold value TH8, i.e., a value appropriate for the height distinguishing the upper half from the lower half of the body of a pedestrian (i.e., "YES" in step S50), the process proceeds to step S50-1 shown in FIG. 10, and it is determined whether or not it is raining around the vehicle 10 (in step S50-1).

In step S50-1, if it is determined that the weather around the vehicle 10 is not rain (i.e., "NO" in step S50-1), it is determined if the height ΔHg of the gray scale object is greater than the threshold value TH16, which is the same value as the above-mentioned threshold value TH8, in order to determine whether or not the object is an article present in the air (for instance, a curved mirror) in step S60.

FIG. 10 is a flowchart showing a procedure for distinguishing a pedestrian whose head portion or an upper half of the body has been extracted by the binary thresholding method. If the height ΔHg of the gray scale object is greater than the threshold value TH16 in step 60 (i.e., "YES" in step S60), it is determined that the object is not an article present in the air. Then, it is determined if a head portion is present at the upper portion in the object area (i.e., the AREA0), or if a body portion is present. More specifically, it is determined if the mean luminance value Ave_A1 of the mask area AREA1 is greater than the threshold value TH17 since the head portion is exposed to the outside (in step S61).

In step S61, if it is determined that the mean luminance value Ave_A1 of the mask area AREA1 is greater than the threshold value TH17 (i.e., "YES" in step S61), it is determined whether the luminance variance Var_A2 of the mask area AREA2 is greater than the threshold value TH18 regarding that the AREA2 has a luminance pattern in the gray scale image since the body portion contains portions from which heat is not easily emitted due to the effects of wearing clothing (in step S62).

Also, in step S62, if it is determined that the luminance variance Var_A2 of the mask area AREA2 is greater than the threshold value TH18 (i.e., "YES" in step S62), it is determined whether the width ΔWb of the binary object is equal to or less than the threshold value TH19, which is a value appropriate for the width for distinguishing a head portion or an upper half of the body of a pedestrian, to determine if it is a pedestrian whose head portion or the upper half of the body has been extracted using the binary process (in step S63).

Also, in step S50-1, if it is determined that the weather around the vehicle 10 is rain (i.e., "YES" in step S50-1), the determination process for the mask areas from steps S60 to S62 are not carried out, and the process proceeds to step S63. In step S63, as mentioned above, it is determined whether the width ΔWb of the binary object is equal to or less than the threshold value TH19, which is a value appropriate for the width for distinguishing a head portion or the upper half of the body of a pedestrian, to determine if it is a pedestrian whose head portion or the upper half of the body has been extracted using the binary process.

Then, if it is determined that the width ΔWb of the binary object is greater than the threshold value TH19 in step S63 (i.e., "NO" in step S63), it is determined whether the width ΔWb of the binary object is equal to or less than the threshold value TH9, which is a value appropriate for the width of a body of a pedestrian, in order to determine if it is a pedestrian whose whole body or at least the upper half of the body has been extracted by the binary process (in step S64).

Moreover, in step S64, if the width ΔWb of the binary object is larger than the threshold value TH9 (i.e., "NO" in step S64), it is determined whether the width ΔWb of the binary object is equal to or less than the threshold value TH2, which is a value appropriate for the width of a body of a pedestrian, in order to determine if a plurality of pedestrians are walking in parallel (in step S65).

Furthermore, in the above-mentioned determination processes, if the height ΔHg of the gray scale is equal to or less than the threshold value TH16 in step S60 (i.e., "NO" in step S60), or if it is determined that the mean luminance value Ave_A1 of the mask area AREA1 is equal to or less than the threshold value TH17 in step S61 (i.e., "NO" in step S61), or if it is determined that the luminance variance Var_A2 of the mask area AREA2 is equal to or less than the threshold value TH18 in step S62 (i.e., "NO" in step S62), or if it is determined that the width ΔWb of the binary object is greater than the threshold value TH2 in step S65 (i.e., "NO" in step S65), it is determined that the detected object (or the object captured in the area AREA0) is not a pedestrian (in step S66), and the pedestrian determination process is terminated. The process then proceeds to step S37 shown in FIG. 5 (via "NO" in step S34), and it is determined that the object is not an object requiring an alarm to be sounded.

Figure 11:
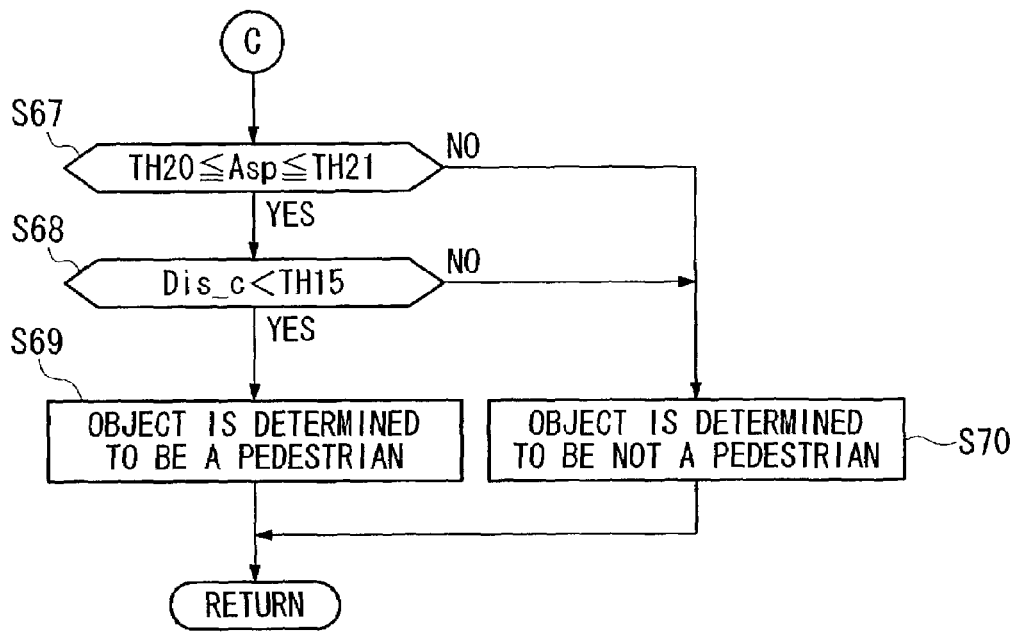
FIG. 11 is a flowchart for explaining a pedestrian determination process according to the embodiment of the present invention.

On the other hand, if it is determined that the width ΔWb of the binary object is equal to or less than the threshold value TH19 in step S63 (i.e., "YES" in step S63), it is determined that the object is a pedestrian whose head portion or the upper half of the body has been extracted by the binary process, and the process proceeds to step S67 in the flowchart shown in FIG. 11. In step S67, it is determined whether the value of Asp, which expresses the aspect ratio of the circumscribed square for the binary object, is equal to or greater than the threshold value TH20 and is equal to or less than the threshold value TH21, i.e., a value appropriate for a head portion or the upper half portion of a pedestrian.

FIG. 11 is a flowchart showing a procedure for distinguishing a pedestrian whose head portion or the upper half of the body has been extracted using the binary process. In step S67, if the value of Asp, which expresses the aspect ratio of the circumscribed square for the binary object, is equal to or greater than the threshold value TH20 and is equal to or less than the threshold value TH21 (i.e., "YES" in step S67), it is determined if the distance Dis_c between the center of gravity in the above-mentioned circumscribed square 102 and the center of gravity G100 in the binary object in the real space is less than the threshold value TH15 (in step S68).

In step S68, if it is determined that the distance Dis_c is less than the threshold value TH15 (i.e., "YES" in step S68), it is regarded that the detected object (or the object captured in the area AREA0) is a pedestrian (in step S69), and the pedestrian determination process is terminated. Then, the process proceeds to step S35 shown in FIG. 5 (via "YES" in step S34) to carry out the artificial structure determination process.

On the other hand, if the value of Asp, which expresses the aspect ratio of the circumscribed square for the binary object, is less than the threshold value TH20 or is greater than the threshold value TH21 (i.e., "NO" in step S67), or in step S68, if it is determined that the distance Dis_c is equal to or greater than the threshold value TH15 (i.e., "NO" in step S68), it is regarded that the detected object (or the object captured in the area AREA0) is not a pedestrian (in step S70), and the pedestrian determination process is terminated. Then, the process proceeds to step S37 shown in FIG. 5 (via "NO" in step S34), and it is determined that the object is not an object requiring an alarm to be sounded.

Figure 12:
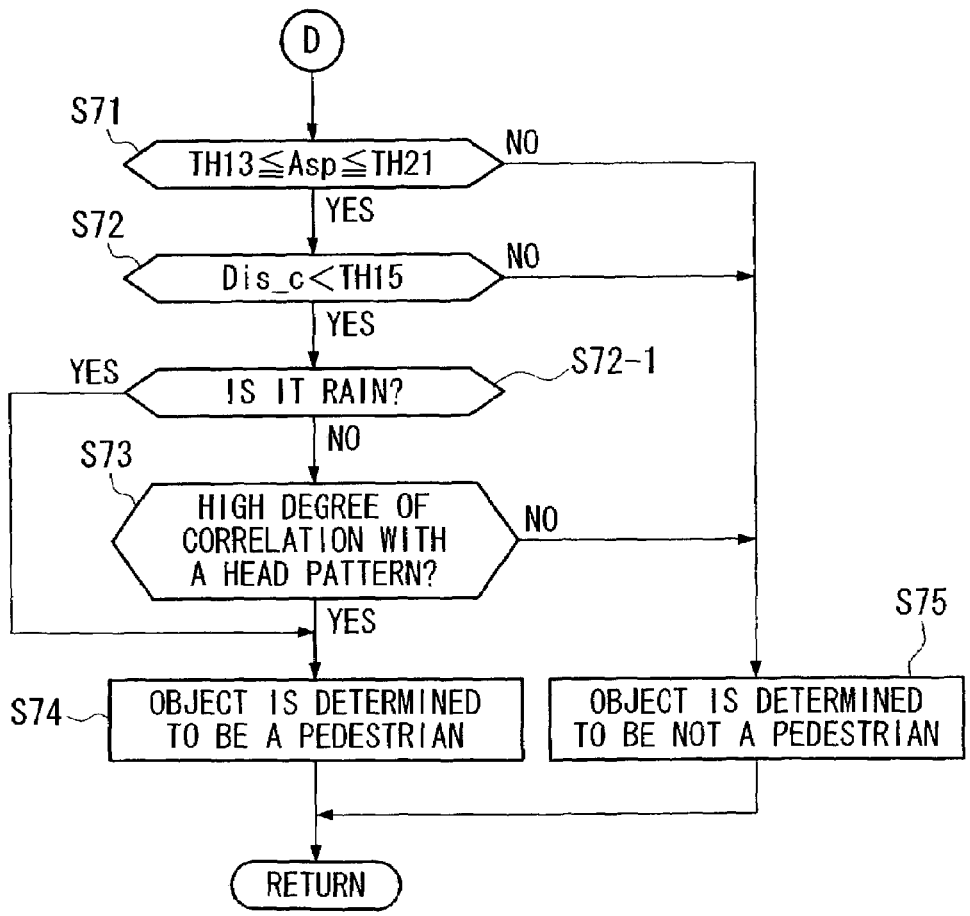
FIG. 12 is a flowchart for explaining a pedestrian determination process according to the embodiment of the present invention.

Also, in step S64 in FIG. 10, if the width ΔWb of the binary object is equal to or less than the threshold value TH9 in step S64 (i.e., "YES" in step S64), it is determined that the object is a pedestrian whose head portion or the upper half of the body has been extracted by the binary process, and the process proceeds to step S71 in the flowchart shown in FIG. 12. In step S71, it is determined whether the value of Asp, which expresses the aspect ratio of the circumscribed square for the binary object, is equal to or greater than the threshold value TH13 and is equal to or less than the threshold value TH21, i.e., if the value is appropriate for the entire or the upper half of the body of a pedestrian.

FIG. 12 is a flowchart showing a procedure for distinguishing a pedestrian whose head portion or the upper half of the body has been extracted using the binary process. In step S71, if the value of Asp, which expresses the aspect ratio of the circumscribed square for the binary object, is equal to or greater than the threshold value TH13 and is equal to or less than the threshold value TH21 (i.e., "YES" in step S71), it is determined if the distance Dis_c between the center of gravity in the above-mentioned circumscribed square 102 and the center of gravity G100 in the binary object in the real space is less than the threshold value TH15 (in step S72).

In step S72, if it is determined that the distance Dis_c is less than the threshold value TH15 (i.e., "YES" in step S72), it is determined whether or not it is raining around the vehicle 10 (in step S72-1).

In step S72-1, if it is determined that the weather around the vehicle 10 is not rain (i.e., "NO" in step S72-1), it is determined if a portion having high correlation with pre-registered patterns of a head portion is present in the mask area AREA1 of the binary object since objects other than a pedestrian, such as a front portion of a vehicle, may be contained among the objects (in step S73).

In step S73, if a portion having a high degree of correlation with pre-registered patterns of a head portion is present in the mask area AREA1 of the binary object (i.e., "YES" in step S73), it is regarded that the detected object (or the object captured in the area AREA0) is a pedestrian (in step S74), and the pedestrian determination process is terminated. Then, the process proceeds to step S35 in FIG. 5 (via "YES" in step S34) to carry out the artificial structure determination process.

Also, in step S72-1, if it is determined that the weather around the vehicle 10 is rain (i.e., "YES" in step S72-1), the determination process for the mask area in step S73 is not performed. Then, the process proceeds to step S74 to determine that the detected object is a pedestrian (in step S74), and the pedestrian determination process is terminated. After this, the process proceeds to step S35 shown in FIG. 5 (via "YES" in step S34) to carry out the artificial structure determination process.

On the other hand, if it is determined that the value of Asp, which expresses the aspect ratio of the circumscribed square for the binary object, is less than the threshold value TH13 or is greater than the threshold value TH21 (i.e., "NO" in step S71), or in step S72, if it is determined that the distance Dis_c is equal to or greater than the threshold value TH15 (i.e., "NO" in step S72), or in step S73, if a portion having high degree of correlation with pre-registered patterns of a head portion is not present in the mask area AREA1 of the binary object (i.e., "NO" in step S73), it is determined that the detected object (or the object captured in the area AREA0) is not a pedestrian (in step S74), and the pedestrian determination process is terminated. Then, the process proceeds to step S37 in FIG. 5 (via "NO" in step S34) to determine that the object is not an object requiring an alarm to be sounded.

Also, in step S65 of the flowchart shown in FIG. 10, if it is determined that the width ΔWb of the binary object is equal to or less than the threshold value TH2 (i.e., "YES" in step S65), it is considered that a large background area is contained in the circumscribed square for the object since the object includes a plurality of pedestrians walking in parallel. The process proceeds to step S76 in FIG. 13 to determine if the value of RATE, which is the ratio of the surface area of the circumscribed square to that of the binary image within a certain period of time, is less than the threshold value TH22 (in step S76).

Figure 13:
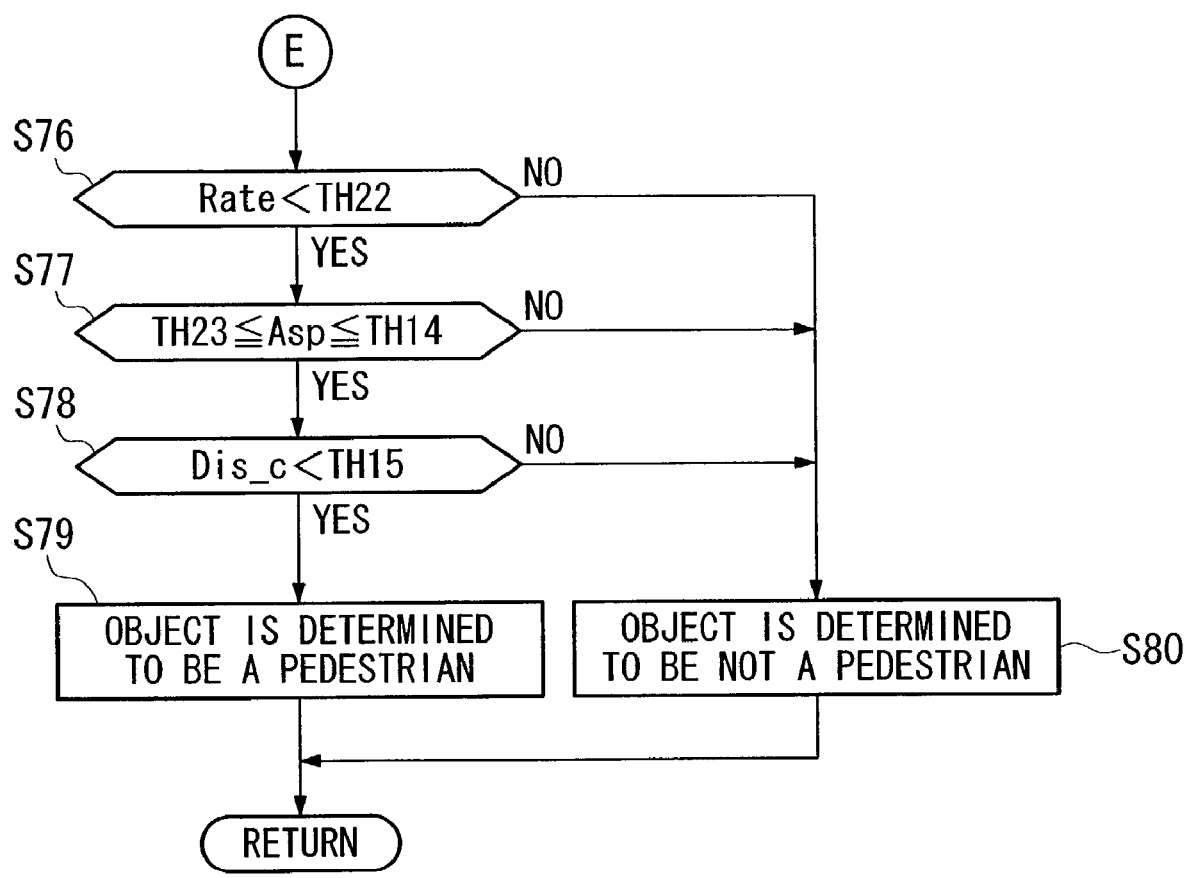
FIG. 13 is a flowchart for explaining a pedestrian determination process according to the embodiment of the present invention.

FIG. 13 is a flowchart showing a procedure for the case where the object is a plurality of pedestrians walking in parallel. If it is determined that the value of RATE, which is the ratio of the surface area of the circumscribed square to that of the binary image within a certain period of time, is less than the threshold value TH22 in step S76 (i.e., "YES" in step S76), it is determined that the value of Asp, which expresses the aspect ratio of the circumscribed square for the binary object, is equal to or greater than the threshold value TH23 and is equal to or less than the threshold value TH14, i.e., the value appropriate for determining pedestrians walking in parallel (in step S77).

In step S77, if the value of Asp, which expresses the aspect ratio of the circumscribed square for the binary object, is equal to or greater than the threshold value TH23 and is equal to or less than the threshold value TH14 (i.e., "YES" in step S77), it is determined whether the distance Dis_c between the center of gravity in the above-mentioned circumscribed square 102 and the center of gravity G100 in the binary object in the real space is less than the threshold value TH15 (in step S78).

In step S78, if it is determined that the distance Dis_c is less than the threshold value TH15 (i.e., "YES" in step S78), it is determined that the detected object (or the object captured in the area AREA0) is a pedestrian (in step S79), and the pedestrian determination process is terminated. Then, the process proceeds to step S35 shown in FIG. 5 (via "YES" in step S34) to carry out the artificial structure determination process.

On the other hand, in step S76, if it is determined that the value of RATE, which is the ratio of the surface area of the circumscribed square to that of the binary image within a certain period of time, is equal to or greater than the threshold value TH22 in step S76 (i.e., "NO" in step S76), or in step S77, if it is determined that the value of Asp, which expresses the aspect ratio of the circumscribed square for the binary object, is less than the threshold value TH23 or is greater than the threshold value TH14 (i.e., "NO" in step S77), or in step S78, if it is determined that the distance Dis_c is equal to or greater than the threshold value TH15 (i.e., "NO" in step S78), it is considered that the detected object (or the object captured in the area AREA0) is not a pedestrian (in step S80), and the pedestrian determination process is terminated. Then, the process proceeds to step S37 shown in FIG. 5 (via "NO" in step S34) to determine that the object is not an object requiring an alarm to be sounded.

Note that in this embodiment of the present invention, the image processing unit 1 includes a weather detection unit, an object extraction unit, a heat-retaining object extraction unit, a pedestrian recognition unit, and a shape determination unit. More specifically, step S41-1 shown in FIG. 8 corresponds to the weather detection unit, steps S1–S13 in FIG. 3 correspond to the object extraction unit, and steps S45, S46, and S47 in FIG. 8, steps S52, S53, and S53-1 in FIG. 9, and steps S60, S61, and S62 in FIG. 10 correspond to the heat-retaining object extraction unit.

Also, steps S48, and S49 in FIG. 8, steps S50, and S54–S59 in FIG. 9, steps S63–S66 in FIG. 10, steps S67–S70 in FIG. 11, steps S71–S75 in FIG. 12, and steps S76–S80 in FIG. 13 correspond to the pedestrian recognition unit. In particular, step S59 in FIG. 9, and step S73 in FIG. 12 correspond to the shape determination unit.

As explained above, the device for monitoring around the vehicle according to the embodiment of the present invention, after extracting an object, such as pedestrian, using the binary thresholding method from a gray scale image of an image taken by the infrared cameras, extracts a gray scale object including the binary object from the gray scale image based on the change in luminance of the gray scale image, and further sets a plurality of search areas in the areas of the gray scale object to recognize a pedestrian in the search areas based on the shape or the luminance variance in the search areas.

Also, if it is determined that it is raining around the vehicle 10, only conditions for the presence of binary objects are determined, and pedestrians in the binary image are recognized based on the height or the size of the binary objects in the image.

In this manner, if it is determined that it is not raining around the vehicle 10, objects which are not likely to be a pedestrian based on the width or the height of the object in the image, are removed from the targeted objects in the image. Also, it is determined if the remaining objects have, as characteristics to a pedestrian, a portion corresponding to a head portion at which the luminance variance is high, and a portion corresponding to a body portion at which the luminance variance is relatively high. Moreover, it is determined whether the object is not an object having a relatively low luminance variance, such as a wall. Then, images of the objects having luminance variance different from that of a pedestrian are removed form the image to improve accuracy in detection for pedestrians.

In addition, if it is determined that it is raining around the vehicle 10, the determination process based on the luminance variance is not carried out since the amount of infrared rays emitted from objects are decreased, and only a process is carried out in which objects that are not likely to be a pedestrian based on the width or the height of the object in the image, are removed from the targeted objects in the image. Accordingly, errors in detecting a pedestrian based on the luminance variance may be prevented, and accuracy in detecting a pedestrian can be maintained according to the present invention.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A device for monitoring around a vehicle capable of detecting objects present around the vehicle based on an image captured by at least one infrared camera provided with said vehicle, said device comprising:
   a binary object extraction unit which subjects a gray scale image of said image captured by said infrared camera to a binary thresholding method, and extracts a binary object from said gray scale image;
   a gray scale object extraction unit which extracts a gray scale object, a range of said gray scale object including said binary object, from said gray scale image based on change in luminance of said gray scale image, and
   a pedestrian determination unit which sets a search area in an area including said gray scale object, and recognizes a pedestrian in said gray scale image based on a luminance variance in said search area, wherein said pedestrian determination unit distinguishes between a pedestrian and other non-pedestrian objects in the gray scale image.

2. A device for monitoring around a vehicle according to claim 1, wherein
   said pedestrian determination unit sets said search area so that a size in a transverse direction of said search area matches a width of said binary object and that a size in a longitudinal direction of said search area matches a height of said binary object.

3. A device for monitoring around a vehicle according to claim 1, wherein
   said pedestrian determination unit sets, as said search area, a head portion area whose size corresponds to a size of a head portion of a pedestrian, based on an upper end of said gray scale object.

4. A device for monitoring around a vehicle according to claim 1, wherein
   said pedestrian determination unit sets, as said search area, a head portion area whose size corresponds to a size of a head portion of a pedestrian, based on an upper end of said gray scale object, and a body portion area whose size corresponds to a body portion of a pedestrian and is larger than said head portion area, below said head portion area.

5. A device for monitoring around a vehicle according to claim 1, wherein said device is used as a night vision device.

6. A device for monitoring around a vehicle according to claim 1, further comprising:
   a heat-retaining object extraction unit which extracts heat-retaining objects that do not generate heat by themselves but retain heat which was externally applied, and emit heat substantially equivalent to that from a pedestrian, from said objects extracted by said object extraction unit, wherein
   said pedestrian recognition unit recognizes a pedestrian from said object extracted by said binary object extraction unit excluding said heat-retaining objects extracted by said heat-retaining object extraction unit.

7. A device for monitoring around a vehicle according to claim 1, further comprising:
   a weather detection unit which detects weather around said vehicle; and
   a heat-retaining object extraction unit which extracts heat-retaining objects that do not generate heat by themselves but retain heat which was externally applied, and emit heat substantially equivalent to that from a pedestrian, from said objects extracted by said object extraction unit; wherein
   said pedestrian recognition unit recognizes a pedestrian from said object extracted by said binary object extraction unit when it is determined by said weather detection unit that weather around said vehicle includes precipitation, and which recognizes a pedestrian from said object extracted by said binary object extraction unit excluding said heat-retaining objects extracted by said heat-retaining object extraction unit when it is determined by said weather detection unit that the weather around said vehicle does not include precipitation.

8. A device for monitoring around a vehicle according to claim 7, further comprising:
   a shape determination unit which determines shapes of said objects, wherein
   said shape determination unit is deactivated when it is determined by said weather detection unit that weather around said vehicle includes precipitation.

9. A device for monitoring around a vehicle capable of detecting objects present around the vehicle based on an infrared image captured by at least one infrared camera provided with said vehicle, said device comprising:
   an object extraction unit which extracts objects which emit infrared rays from said infrared image;
   a heat-retaining object extraction unit which extracts heat-retaining objects that do not generate heat by themselves but retain heat which was externally applied, and emit heat substantially equivalent to that from a pedestrian, from said objects extracted by said object extraction unit, and a pedestrian recognition unit which recognizes a pedestrian front said objects extracted by said object extraction unit excluding said heat-retaining objects extracted by said heat-retaining object extraction unit, wherein said pedestrian determination unit distinguishes between a pedestrian and other non-pedestrian objects in the gray scale image.

10. A device for monitoring around a vehicle capable of detecting objects present around the vehicle based on an infrared image captured by at least one infrared camera provided with said vehicle, said device comprising:

a weather detection unit which detects weather around said vehicle;

an object extraction unit which extracts objects which emit infrared rays from said infrared image;

a heat-retaining object extraction unit which extracts heat-retaining objects that do not generate heat by themselves but retain heat which was externally applied, and emit heat substantially equivalent to that from a pedestrian, from said objects extracted by said object extraction unit; and a pedestrian recognition unit which recognizes a pedestrian from said objects extracted by said object extraction unit when it is determined by said weather detection unit that weather around said vehicle includes precipitation, and which recognizes a pedestrian from said objects extracted by said object extraction unit excluding said heat-retaining objects extracted by said heat-retaining object extraction unit when it is determined by said weather detection unit that the weather around said vehicle does not include precipitation, wherein said pedestrian determination unit distinguishes between a pedestrian and other non-pedestrian objects in the gray scale image.

11. A device for monitoring around a vehicle according to claim 10, further comprising:

a shape determination unit which determines shapes of said objects, wherein said shape determination unit is deactivated when it is determined by said weather detection unit that weather around said vehicle includes precipitation.

* * * * *